(12) United States Patent
Trott et al.

(10) Patent No.: US 9,913,348 B2
(45) Date of Patent: Mar. 6, 2018

(54) LIGHT FIXTURES, SYSTEMS FOR CONTROLLING LIGHT FIXTURES, AND METHODS OF CONTROLLING FIXTURES AND METHODS OF CONTROLLING LIGHTING CONTROL SYSTEMS

(71) Applicant: CREE, INC., Durham, NC (US)

(72) Inventors: Gary David Trott, Eatonton, GA (US); Paul Kenneth Pickard, Morrisville, NC (US); James Michael Lay, Apex, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 13/719,786

(22) Filed: Dec. 19, 2012

(65) Prior Publication Data

US 2014/0167621 A1    Jun. 19, 2014

(51) Int. Cl.
*H05B 37/02*    (2006.01)
*H05B 39/04*    (2006.01)

(52) U.S. Cl.
CPC ..... *H05B 37/0218* (2013.01); *H05B 37/0227* (2013.01); *H05B 39/042* (2013.01);
(Continued)

(58) Field of Classification Search
CPC .......................... H05B 37/02; H05B 37/0227; H05B 37/0218; H05B 37/0245; H05B 37/0281
(Continued)

(56) References Cited

U.S. PATENT DOCUMENTS

D259,514 S    6/1981    Welch
D317,363 S    6/1991    Welch
(Continued)

FOREIGN PATENT DOCUMENTS

AT    492840 T    1/2011
AU    3666702 A    5/2002
(Continued)

OTHER PUBLICATIONS

Author Unknown, "Cluster Analysis", Wikipedia—the free encyclopedia, Updated May 21, 2013, Retrieved on May 30, 2013, http://en.wikipedia.org/wiki/cluster_analysis, 16 pages.
(Continued)

*Primary Examiner* — Thuy Vinh Tran
(74) *Attorney, Agent, or Firm* — Withrow & Terranova, P.L.L.C.

(57) ABSTRACT

A fixture comprising a light sensor and an actuator for assigning the fixture to at least one zone. A fixture comprising a light source, a motion sensor and a light sensor. A fixture comprising a motion sensor, a light sensor and a wireless transmitter (optionally also a wireless receiver). A fixture configured to detect light brightness values over a time-span, and identify a period of time with smallest average brightness. A fixture configured to dim at a first rate when a motion sensor senses no motion for a designated period of time, and optionally also configured to brighten at a second rate when the motion sensor detects motion. A fixture configured to dim to not less than a designated percentage unless motion is detected during the dimming. A lighting control system, comprising fixtures and an actuator configured to assign fixtures to zones. Also, other lighting control systems and methods.

14 Claims, 3 Drawing Sheets

(52) U.S. Cl.
CPC ...... *H05B 37/0245* (2013.01); *H05B 37/0281* (2013.01); *Y02B 20/44* (2013.01); *Y02B 20/46* (2013.01)

(58) Field of Classification Search
USPC ....... 315/149, 150, 151, 152, 155, 291, 308, 315/360
See application file for complete search history.

(56) References Cited

U.S. PATENT DOCUMENTS

| | | |
|---|---|---|
| 5,079,680 A | 1/1992 | Kohn |
| D344,361 S | 2/1994 | Friedman et al. |
| D349,582 S | 8/1994 | Bain et al. |
| 5,471,119 A | 11/1995 | Ranganath et al. |
| D373,438 S | 9/1996 | McCann-Compton et al. |
| 6,100,643 A | 8/2000 | Nilssen |
| 6,118,230 A | 9/2000 | Fleischmann |
| 6,137,408 A | 10/2000 | Okada |
| 6,160,359 A | 12/2000 | Fleischmann |
| 6,166,496 A | 12/2000 | Lys et al. |
| 6,437,692 B1 | 8/2002 | Petite et al. |
| 6,441,558 B1 | 8/2002 | Muthu et al. |
| 6,528,954 B1 | 3/2003 | Lys et al. |
| 6,553,218 B1 | 4/2003 | Boesjes |
| 6,735,630 B1 | 5/2004 | Gelvin et al. |
| 6,804,790 B2 | 10/2004 | Rhee et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,914,893 B2 | 7/2005 | Petite |
| 6,975,851 B2 | 12/2005 | Boesjes |
| 6,990,394 B2 | 1/2006 | Pasternak |
| 7,009,348 B2 | 3/2006 | Mogilner et al. |
| 7,020,701 B1 | 3/2006 | Gelvin et al. |
| 7,031,920 B2 | 4/2006 | Dowling et al. |
| 7,103,511 B2 | 9/2006 | Petite |
| 7,139,562 B2 | 11/2006 | Matsui |
| 7,288,902 B1 | 10/2007 | Melanson |
| 7,305,467 B2 | 12/2007 | Kaiser et al. |
| 7,313,399 B2 | 12/2007 | Rhee et al. |
| D560,006 S | 1/2008 | Garner et al. |
| 7,344,279 B2 | 3/2008 | Mueller et al. |
| D565,771 S | 4/2008 | Garner et al. |
| D567,431 S | 4/2008 | Garner et al. |
| 7,391,297 B2 | 6/2008 | Cash et al. |
| D582,598 S | 12/2008 | Kramer et al. |
| 7,468,661 B2 | 12/2008 | Petite et al. |
| 7,482,567 B2 | 1/2009 | Hoelen et al. |
| 7,484,008 B1 | 1/2009 | Gelvin et al. |
| D586,950 S | 2/2009 | Garner et al. |
| D587,390 S | 2/2009 | Garner et al. |
| D588,064 S | 3/2009 | Garner et al. |
| 7,522,563 B2 | 4/2009 | Rhee |
| D594,576 S | 6/2009 | Chan et al. |
| 7,587,289 B1 | 9/2009 | Sivertsen |
| 7,606,572 B2 | 10/2009 | Rhee et al. |
| 7,638,743 B2 | 12/2009 | Bartol et al. |
| 7,649,456 B2 | 1/2010 | Wakefield et al. |
| 7,657,249 B2 | 2/2010 | Boesjes |
| 7,683,301 B2 | 3/2010 | Papamichael et al. |
| 7,697,492 B2 | 4/2010 | Petite |
| 7,797,367 B1 | 9/2010 | Gelvin et al. |
| 7,844,308 B2 | 11/2010 | Rhee et al. |
| 7,844,687 B1 | 11/2010 | Gelvin et al. |
| 7,868,562 B2 | 1/2011 | Salsbury et al. |
| 7,891,004 B1 | 2/2011 | Gelvin et al. |
| 7,904,569 B1 | 3/2011 | Gelvin et al. |
| 7,924,174 B1 | 4/2011 | Gananathan |
| 7,924,927 B1 | 4/2011 | Boesjes |
| 7,948,930 B2 | 5/2011 | Rhee |
| 8,011,794 B1 | 9/2011 | Sivertsen |
| 8,021,021 B2 | 9/2011 | Paolini |
| 8,035,320 B2* | 10/2011 | Sibert .................. H05B 37/00 315/312 |
| 8,079,118 B2 | 12/2011 | Gelvin et al. |
| 8,098,615 B2 | 1/2012 | Rhee |
| 8,126,429 B2 | 2/2012 | Boesjes |
| 8,140,658 B1 | 3/2012 | Gelvin et al. |
| D663,048 S | 7/2012 | Chen |
| 8,228,163 B2 | 7/2012 | Cash et al. |
| 8,271,058 B2 | 9/2012 | Rhee et al. |
| 8,274,928 B2 | 9/2012 | Dykema et al. |
| 8,275,471 B2 | 9/2012 | Huizenga et al. |
| 8,344,660 B2* | 1/2013 | Mohan et al. ................ 315/307 |
| 8,364,325 B2 | 1/2013 | Huizenga et al. |
| 8,461,781 B2 | 6/2013 | Schenk et al. |
| 8,466,626 B2* | 6/2013 | Null .................... H05B 37/0218 315/159 |
| 8,497,634 B2 | 7/2013 | Scharf |
| 8,511,851 B2 | 8/2013 | Van de Ven et al. |
| 8,536,792 B1 | 9/2013 | Roosli |
| 8,536,984 B2 | 9/2013 | Benetz et al. |
| 8,604,714 B2* | 12/2013 | Mohan et al. ................ 315/307 |
| 8,610,377 B2 | 12/2013 | Chemel et al. |
| D703,841 S | 4/2014 | Feng et al. |
| D708,360 S | 7/2014 | Shibata et al. |
| 8,981,671 B2 | 3/2015 | Karasawa et al. |
| 9,041,315 B2* | 5/2015 | Cho et al. ............ H05B 37/029 315/292 |
| 9,326,358 B2 | 4/2016 | Campbell et al. |
| 9,351,381 B2 | 5/2016 | Verfuerth et al. |
| 9,408,268 B2 | 8/2016 | Recker et al. |
| 9,504,133 B2 | 11/2016 | Verfuerth et al. |
| 9,538,617 B2 | 1/2017 | Rains, Jr. et al. |
| 2002/0047646 A1 | 4/2002 | Lys et al. |
| 2002/0195975 A1 | 12/2002 | Schanberger et al. |
| 2004/0001963 A1 | 1/2004 | Watanabe et al. |
| 2004/0002792 A1 | 1/2004 | Hoffknecht |
| 2004/0051467 A1 | 3/2004 | Balasubramaniam et al. |
| 2004/0139741 A1 | 7/2004 | Balle et al. |
| 2004/0193741 A1 | 9/2004 | Pereira et al. |
| 2004/0232851 A1 | 11/2004 | Roach, Jr. et al. |
| 2005/0127381 A1 | 6/2005 | Vitta et al. |
| 2005/0132080 A1 | 6/2005 | Rhee et al. |
| 2006/0022214 A1 | 2/2006 | Morgan et al. |
| 2006/0044152 A1 | 3/2006 | Wang |
| 2006/0066266 A1 | 3/2006 | Li Lim et al. |
| 2006/0125426 A1 | 6/2006 | Veskovic et al. |
| 2006/0262545 A1 | 11/2006 | Piepgras et al. |
| 2007/0040512 A1 | 2/2007 | Jungwirth et al. |
| 2007/0085700 A1 | 4/2007 | Walters et al. |
| 2007/0126656 A1 | 6/2007 | Huang et al. |
| 2007/0132405 A1 | 6/2007 | Hillis et al. |
| 2007/0189000 A1 | 8/2007 | Papamichael et al. |
| 2007/0291483 A1 | 12/2007 | Lys |
| 2008/0031213 A1 | 2/2008 | Kaiser et al. |
| 2008/0088435 A1 | 4/2008 | Cash et al. |
| 2008/0197790 A1 | 8/2008 | Mangiaracina et al. |
| 2008/0218087 A1 | 9/2008 | Crouse et al. |
| 2008/0218334 A1 | 9/2008 | Pitchers et al. |
| 2008/0225521 A1 | 9/2008 | Waffenschmidt et al. |
| 2008/0265799 A1 | 10/2008 | Sibert |
| 2009/0021955 A1 | 1/2009 | Kuang et al. |
| 2009/0026966 A1 | 1/2009 | Budde et al. |
| 2009/0184616 A1 | 7/2009 | Van de Ven et al. |
| 2009/0212718 A1 | 8/2009 | Kawashima et al. |
| 2009/0230894 A1 | 9/2009 | De Goederen et al. |
| 2009/0231832 A1 | 9/2009 | Zukauskas et al. |
| 2009/0284169 A1 | 11/2009 | Valois |
| 2009/0284184 A1 | 11/2009 | Valois et al. |
| 2009/0302994 A1 | 12/2009 | Rhee et al. |
| 2009/0302996 A1 | 12/2009 | Rhee et al. |
| 2009/0305644 A1 | 12/2009 | Rhee et al. |
| 2009/0315485 A1 | 12/2009 | Verfuerth et al. |
| 2009/0315668 A1 | 12/2009 | Leete, III et al. |
| 2010/0007289 A1 | 1/2010 | Budike, Jr. |
| 2010/0084992 A1 | 4/2010 | Valois et al. |
| 2010/0128634 A1 | 5/2010 | Rhee et al. |
| 2010/0134051 A1* | 6/2010 | Huizenga et al. ........... 315/362 |
| 2010/0148940 A1 | 6/2010 | Gelvin et al. |
| 2010/0150122 A1 | 6/2010 | Berger et al. |
| 2010/0201516 A1 | 8/2010 | Gelvin et al. |
| 2010/0203515 A1 | 8/2010 | Rigler |

(56) References Cited

U.S. PATENT DOCUMENTS

| | | | |
|---|---|---|---|
| 2010/0270935 A1 | 10/2010 | Otake et al. | |
| 2010/0295473 A1 | 11/2010 | Chemel et al. | |
| 2010/0301770 A1 | 12/2010 | Chemel et al. | |
| 2010/0301773 A1 | 12/2010 | Chemel et al. | |
| 2010/0301774 A1 | 12/2010 | Chemel et al. | |
| 2010/0308664 A1 | 12/2010 | Face et al. | |
| 2011/0133655 A1 | 1/2011 | Recker et al. | |
| 2011/0025469 A1 | 2/2011 | Erdmann et al. | |
| 2011/0031897 A1 | 2/2011 | Henig et al. | |
| 2011/0035491 A1 | 2/2011 | Gelvin et al. | |
| 2011/0057581 A1 | 3/2011 | Ashar et al. | |
| 2011/0080120 A1 | 4/2011 | Talstra et al. | |
| 2011/0101871 A1 | 5/2011 | Schenk et al. | |
| 2011/0115384 A1 | 5/2011 | Chatelus | |
| 2011/0115407 A1 | 5/2011 | Wibben et al. | |
| 2011/0137757 A1 | 6/2011 | Paolini et al. | |
| 2011/0156596 A1* | 6/2011 | Salsbury | 315/152 |
| 2011/0178650 A1 | 7/2011 | Picco | |
| 2011/0199004 A1 | 8/2011 | Henig et al. | |
| 2011/0199020 A1 | 8/2011 | Henig et al. | |
| 2011/0215725 A1 | 9/2011 | Paolini | |
| 2011/0221350 A1 | 9/2011 | Staab | |
| 2011/0249441 A1 | 10/2011 | Donegan | |
| 2011/0254554 A1 | 10/2011 | Harbers | |
| 2011/0298598 A1 | 12/2011 | Rhee | |
| 2012/0007725 A1 | 1/2012 | Penisoara et al. | |
| 2012/0013257 A1 | 1/2012 | Sibert | |
| 2012/0026733 A1 | 2/2012 | Graeber et al. | |
| 2012/0040606 A1 | 2/2012 | Verfuerth | |
| 2012/0050535 A1 | 3/2012 | Densham et al. | |
| 2012/0079149 A1 | 3/2012 | Gelvin et al. | |
| 2012/0082062 A1 | 4/2012 | McCormack | |
| 2012/0086345 A1 | 4/2012 | Tran | |
| 2012/0087290 A1 | 4/2012 | Rhee et al. | |
| 2012/0091915 A1 | 4/2012 | Ilyes et al. | |
| 2012/0126705 A1 | 5/2012 | Pezzutti et al. | |
| 2012/0130544 A1 | 5/2012 | Mohan et al. | |
| 2012/0135692 A1 | 5/2012 | Feri et al. | |
| 2012/0136485 A1 | 5/2012 | Weber et al. | |
| 2012/0139426 A1 | 6/2012 | Ilyes et al. | |
| 2012/0147604 A1 | 6/2012 | Farmer | |
| 2012/0147808 A1 | 6/2012 | Rhee | |
| 2012/0153840 A1 | 6/2012 | Dahlen et al. | |
| 2012/0161643 A1 | 6/2012 | Henig et al. | |
| 2012/0176041 A1 | 7/2012 | Birru | |
| 2012/0206050 A1* | 8/2012 | Spero | 315/152 |
| 2012/0223657 A1 | 9/2012 | Van de Ven | |
| 2012/0224457 A1 | 9/2012 | Kim et al. | |
| 2012/0229048 A1 | 9/2012 | Archer | |
| 2012/0230696 A1 | 9/2012 | Pederson et al. | |
| 2012/0235579 A1 | 9/2012 | Chemel et al. | |
| 2012/0235600 A1 | 9/2012 | Simonian et al. | |
| 2012/0242242 A1 | 9/2012 | Linz et al. | |
| 2012/0242254 A1 | 9/2012 | Kim et al. | |
| 2012/0271477 A1 | 10/2012 | Okubo et al. | |
| 2012/0299485 A1* | 11/2012 | Mohan et al. | 315/153 |
| 2012/0306375 A1 | 12/2012 | van de Ven | |
| 2012/0306377 A1 | 12/2012 | Igaki et al. | |
| 2012/0320262 A1 | 12/2012 | Chung | |
| 2013/0002157 A1 | 1/2013 | van de Ven et al. | |
| 2013/0002167 A1 | 1/2013 | Van de Ven | |
| 2013/0013091 A1 | 1/2013 | Cavalcanti et al. | |
| 2013/0026953 A1 | 1/2013 | Woytowitz | |
| 2013/0049606 A1 | 2/2013 | Ferstl et al. | |
| 2013/0051806 A1 | 2/2013 | Quilici et al. | |
| 2013/0057395 A1 | 3/2013 | Ohashi | |
| 2013/0058258 A1 | 3/2013 | Boesjes | |
| 2013/0063042 A1 | 3/2013 | Bora et al. | |
| 2013/0069539 A1* | 3/2013 | So | 315/152 |
| 2013/0075484 A1 | 3/2013 | Rhee et al. | |
| 2013/0077299 A1 | 3/2013 | Hussell et al. | |
| 2013/0088168 A1 | 4/2013 | Mohan et al. | |
| 2013/0093328 A1 | 4/2013 | Ivey et al. | |
| 2013/0147366 A1 | 6/2013 | Huizenga et al. | |
| 2013/0154831 A1 | 6/2013 | Gray et al. | |
| 2013/0155392 A1 | 6/2013 | Barrilleaux et al. | |
| 2013/0155672 A1 | 6/2013 | Vo et al. | |
| 2013/0200805 A1* | 8/2013 | Scapa et al. | 315/131 |
| 2013/0221857 A1 | 8/2013 | Bowers | |
| 2013/0229784 A1 | 9/2013 | Lessard et al. | |
| 2013/0320862 A1 | 12/2013 | Campbell et al. | |
| 2013/0328486 A1 | 12/2013 | Jones | |
| 2013/0342911 A1 | 12/2013 | Bartol et al. | |
| 2014/0001952 A1 | 1/2014 | Harris et al. | |
| 2014/0001959 A1 | 1/2014 | Motley et al. | |
| 2014/0001977 A1* | 1/2014 | Zacharchuk et al. | 315/291 |
| 2014/0062678 A1 | 3/2014 | de Clercq et al. | |
| 2014/0167646 A1 | 6/2014 | Zukauskas et al. | |
| 2014/0212090 A1 | 7/2014 | Wilcox et al. | |
| 2014/0232299 A1 | 8/2014 | Wang | |
| 2014/0268790 A1 | 9/2014 | Chobot et al. | |
| 2014/0312777 A1 | 10/2014 | Shearer et al. | |
| 2015/0008827 A1 | 1/2015 | Carrigan et al. | |
| 2015/0008828 A1 | 1/2015 | Carrigan et al. | |
| 2015/0008829 A1 | 1/2015 | Lurie et al. | |
| 2015/0008831 A1 | 1/2015 | Carrigan et al. | |
| 2015/0015145 A1 | 1/2015 | Carrigan et al. | |
| 2015/0022096 A1 | 1/2015 | Deixler | |
| 2015/0042243 A1 | 2/2015 | Picard | |
| 2015/0048758 A1 | 2/2015 | Carrigan et al. | |
| 2015/0195883 A1 | 7/2015 | Harris et al. | |
| 2015/0264780 A1 | 9/2015 | Harris et al. | |
| 2015/0345762 A1 | 12/2015 | Creasman et al. | |
| 2015/0351169 A1 | 12/2015 | Pope et al. | |
| 2015/0351187 A1 | 12/2015 | McBryde et al. | |
| 2015/0351191 A1 | 12/2015 | Pope et al. | |
| 2015/0382424 A1 | 12/2015 | Knapp et al. | |
| 2016/0029464 A1 | 1/2016 | Hughes et al. | |

FOREIGN PATENT DOCUMENTS

| | | |
|---|---|---|
| AU | 2002219810 A8 | 5/2002 |
| AU | 2002352922 A1 | 6/2003 |
| CA | 2426769 A1 | 5/2002 |
| CA | 2511368 A1 | 5/2002 |
| CN | 1679376 A | 10/2005 |
| CN | 101138279 A | 3/2008 |
| CN | 101444145 A | 5/2009 |
| CN | 101461151 A | 6/2009 |
| CN | 102017801 A | 4/2011 |
| CN | 102106188 A | 6/2011 |
| CN | 102119507 A | 7/2011 |
| CN | 102461288 A | 5/2012 |
| DE | 60143707 | 2/2011 |
| EP | 1330699 A1 | 7/2003 |
| EP | 1334608 A2 | 8/2003 |
| EP | 1461907 A1 | 9/2004 |
| EP | 1719363 A2 | 11/2006 |
| EP | 1886415 A2 | 2/2008 |
| EP | 2304311 A1 | 4/2011 |
| EP | 2327184 A1 | 6/2011 |
| EP | 2440017 A2 | 4/2012 |
| HK | 1114508 | 10/2008 |
| IN | 4576/KOLNP/2007 | 7/2008 |
| JP | H11345690 A | 12/1999 |
| JP | 2001155870 A | 6/2001 |
| JP | 2003178889 A | 6/2003 |
| JP | 2005510956 A | 4/2005 |
| JP | 3860116 B2 | 12/2006 |
| JP | 3896573 B2 | 3/2007 |
| JP | 2010050069 A | 3/2010 |
| JP | 2010073633 A | 4/2010 |
| JP | 2010198877 A | 9/2010 |
| JP | 2011526414 A | 10/2011 |
| JP | 2012226993 A | 11/2012 |
| KR | 20060050614 A | 5/2006 |
| KR | 20080025095 A | 3/2008 |
| KR | 20110001782 A | 1/2011 |
| KR | 20110095510 A | 8/2011 |
| WO | 0126068 A1 | 4/2001 |
| WO | 0126327 A2 | 4/2001 |
| WO | 0126328 A2 | 4/2001 |
| WO | 0126329 A2 | 4/2001 |
| WO | 0126331 A2 | 4/2001 |

(56) References Cited

FOREIGN PATENT DOCUMENTS

| | | | |
|---|---|---|---|
| WO | 0126332 | A2 | 4/2001 |
| WO | 0126333 | A2 | 4/2001 |
| WO | 0126334 | A2 | 4/2001 |
| WO | 0126335 | A2 | 4/2001 |
| WO | 0126338 | A2 | 4/2001 |
| WO | 0239242 | A1 | 5/2002 |
| WO | 0241604 | A2 | 5/2002 |
| WO | 03047175 | A1 | 6/2003 |
| WO | 2004109966 | A2 | 12/2004 |
| WO | 2006095316 | A1 | 9/2006 |
| WO | 2006130662 | A2 | 12/2006 |
| WO | 2007102097 | A1 | 9/2007 |
| WO | 2009011898 | A2 | 1/2009 |
| WO | 2009076492 | A1 | 6/2009 |
| WO | 2009145747 | A1 | 12/2009 |
| WO | 2009151416 | A1 | 12/2009 |
| WO | 2009158514 | A1 | 12/2009 |
| WO | 2010010493 | A2 | 1/2010 |
| WO | 2010047971 | A2 | 4/2010 |
| WO | 2010122457 | A2 | 10/2010 |
| WO | 2011087681 | A1 | 7/2011 |
| WO | 2011090938 | A1 | 7/2011 |
| WO | 2011123614 | A1 | 10/2011 |
| WO | 2011152968 | A1 | 12/2011 |
| WO | 2012112813 | A2 | 8/2012 |
| WO | 2012125502 | A2 | 9/2012 |
| WO | 2013050970 | A1 | 4/2013 |
| WO | 2014120971 | A1 | 8/2014 |

OTHER PUBLICATIONS

Author Unknown, "Multi-Agent System", Wikipedia—the free encyclopedia, Updated Apr. 18, 2013, Retrieved May 30, 2013, http://en.wikipedia.org/wiki/multi-agent_system, 7 pages.
Author Unknown, i2C-Bus: What's That?, Updated 2012, Retrieved May 30, 2013, http://www.i2c-bus.org, 1 page.
Harris, Michael, "Lighting Component with Independent DC-DC Converters", U.S. Appl. No. 13/606,713, filed Sep. 7, 2012, 42 pages.
Harris, Michael, "Modular Lighting Control", U.S. Appl. No. 13/589,899, filed Aug. 20, 2012, 54 pages.
Kuhn, Fabian et al., "Initializing Newly Deployed Ad Hoc & Sensor Network", The Tenth Annual International Conference on Mobile Computing and Networking (MobiCom '04), Sep. 26-Oct. 4, 2004, 15 pages, Philadelphia, PA.
Randolph, David, et al., "Lighting Fixture", U.S. Appl. No. 13/649,531, filed Oct. 11, 2012, 60 pages.
Teasdale, Dana et al., "Annual Technical Progress Report: Adapting Wireless Technology to Lighting Control and Environmental Sensing," Dust Networks, Aug. 1, 2004, 41 pages.
International Search Report and Written Opinion for PCT/US2013/075723, dated May 9, 2014, 8 pages.
Non-Final Office Action for U.S. Appl. No. 13/782,040, dated May 8, 2013, 10 pages.
Final Office Action for U.S. Appl. No. 13/782,040, dated Oct. 18, 2013, 16 pages.
Non-Final Office Action for U.S. Appl. No. 13/782,040, dated Feb. 11, 2014, 10 pages.
International Search Report and Written Opinion for International Application PCT/US2013/075729, dated Apr. 29, 2014, 8 pages.
Invitation to Pay Additional Fees and Partial International Search for PCT/US2013/075737, dated May 13, 2014, 5 pages.
Non-Final Office Action for U.S. Appl. No. 13/782,068, dated Jul. 16, 2013, 6 pages.
Notice of Allowance for U.S. Appl. No. 13/782,068, dated Oct. 22, 2013, 9 pages.
Non-Final Office Action for U.S. Appl. No. 13/782,068, dated Nov. 15, 2013, 5 pages.
Final Office Action for U.S. Appl. No. 13/782,068, dated Mar. 7, 2014, 7 pages.
Notice of Allowance for U.S. Appl. No. 13/782,068, dated May 12, 2014, 7 pages.
Invitation to Pay Additional Fees and Partial International Search for PCT/US2013/075742, dated May 14, 2014, 6 pages.
Quayle Action for U.S. Appl. No. 13/782,078, dated Jun. 12, 2013, 4 pages.
Notice of Allowance for U.S. Appl. No. 13/782,078, dated Sep. 16, 2013, 7 pages.
Supplemental Notice of Allowability for U.S. Appl. No. 13/782,078, dated Sep. 27, 2013, 2 pages.
International Search Report and Written Opinion for PCT/US2013/075748, dated May 9, 2014, 7 pages.
Non-Final Office Action for U.S. Appl. No. 13/782,096, dated Jun. 10, 2013, 12 pages.
Final Office Action for U.S. Appl. No. 13/782,096, dated Nov. 18, 2013, 15 pages.
Advisory Action for U.S. Appl. No. 13/782,096, dated Jan. 27, 2014, 3 pages.
International Search Report and Written Opinion for PCT/US2013/075754, dated May 15, 2014, 8 pages.
Non-Final Office Action for U.S. Appl. No. 13/782,131, dated May 28, 2013, 10 pages.
Non-Final Office Action for U.S. Appl. No. 13/782,131, dated Nov. 6, 2013, 8 pages.
Notice of Allowance for U.S. Appl. No. 13/782,131, dated Feb. 20, 2014, 9 pages.
International Search Report and Written Opinion for PCT/US2013/075761, dated May 15, 2014, 7 pages.
Notice of Allowance for U.S. Appl. No. 13/782,040 dated Jul. 23, 2014, 8 pages.
International Search Report and Written Opinion for PCT/US2013/075737, dated Aug. 27, 2014, 11 pages.
Non-Final Office Action for U.S. Appl. No. 13/782,068, dated Aug. 15, 2014, 6 pages.
International Search Report and Written Opinion for PCT/US2013/075742, dated Aug. 27, 2014, 11 pages.
Examiner's Answer to the Appeal Brief for U.S. Appl. No. 13/782,096, dated Jul. 7, 2014, 17 pages.
Notice of Allowance for U.S. Appl. No. 13/782,131, dated Jun. 5, 2014, 5 pages.
Invitation to Pay Additional Fees and Partial International Search Report for PCT/US2013/075777, dated Jun. 5, 2014, 6 pages.
International Search Report and Written Opinion for PCT/US2013/075777, dated Aug. 12, 2014, 14 pages.
Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Data Terminal Equipment (DTE) Power Via Media Dependent Interface (MDI)," Standard 802.3af-2003, Jun. 18, 2003, The Institute of Electrical and Electronics Engineers, Inc., 133 pages.
Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment 3: Data Terminal Equipment (DTE) Power via the Media Dependent Interface (MDI) Enhancements," Standard 802.3at-2009, Sep. 11, 2009, The Institute of Electrical and Electronics Engineers, Inc., 141 pages.
Non-Final Office Action for U.S. Appl. No. 13/782,022, dated Nov. 14, 2014, 14 pages.
Notice of Allowance for U.S. Appl. No. 13/782,040 dated Nov. 17, 2014, 8 pages.
Non-Final Office Action for U.S. Appl. No. 13/782,053, dated Nov. 14, 2014, 11 pages.
Notice of Allowance for U.S. Appl. No. 13/782,131, dated Oct. 28, 2014, 5 pages.
Requirement for Restriction/Election for U.S. Appl. No. 29/452,813, dated Nov. 21, 2014, 6 pages.

(56) References Cited

OTHER PUBLICATIONS

Notice of Allowance for U.S. Appl. No. 13/782,022, dated Apr. 27, 2015, 8 pages.
Notice of Allowance for U.S. Appl. No. 13/782,053, dated Apr. 2, 2015, 8 pages.
Notice of Allowance for U.S. Appl. No. 29/452,813, dated Mar. 18, 2015, 7 pages.
Supplemental Notice of Allowability for U.S. Appl. No. 29/452,813, dated May 1, 2015, 4 pages.
Non-Final Office Action for U.S. Appl. No. 13/868,021, dated Apr. 17, 2015, 10 pages.
International Search Report and Written Opinion for PCT/US2015/010050, dated Mar. 24, 2015, 10 pages.
Non-Final Office Action for U.S. Appl. No. 14/292,286, dated Nov. 19, 2015, 16 pages.
Non-Final Office Action for U.S. Appl. No. 14/292,363, dated Nov. 19, 2015, 9 pages.
Non-Final Office Action for U.S. Appl. No. 14/292,332, dated Dec. 3, 2015, 18 pages.
Applicant-Initiated Interview Summary for U.S. Appl. No. 14/287,812, dated Jan. 5, 2016, 4 pages.
International Preliminary Report on Patentability for PCT/US2013/075723, dated Jul. 2, 2015, 6 pages.
International Preliminary Report on Patentability for PCT/US2013/075729, dated Jul. 2, 2015, 6 pages.
International Preliminary Report on Patentability for PCT/US2013/075737, dated Jul. 2, 2015, 7 pages.
International Preliminary Report on Patentability for PCT/US2013/075742, dated Jul. 2, 2015, 7 pages.
International Preliminary Report on Patentability for PCT/US2013/075748, dated Jul. 2, 2015, 5 pages.
International Preliminary Report on Patentability for PCT/US2013/075754, dated Jul. 2, 2015, 5 pages.
International Preliminary Report on Patentability for PCT/US2013/075761, dated Jul. 2, 2015, 5 pages.
International Preliminary Report on Patentability for PCT/US2013/075777, dated Jul. 2, 2015, 10 pages.
International Search Report and Written Opinion for PCT/US2015/032431, dated Jul. 24, 2015, 11 pages.
Notice of Allowance for U.S. Appl. No. 13/782,022, dated Jul. 22, 2015, 8 pages.
Notice of Allowance for U.S. Appl. No. 13/782,053, dated Jul. 17, 2015, 8 pages.
Notice of Allowance for U.S. Appl. No. 29/452,813, dated Sep. 3, 2015, 7 pages.
Final Office Action for U.S. Appl No. 13/868,021, dated Jul. 23, 2015, 11 pages.
Notice of Allowance for U.S. Appl. No. 13/782,068, dated Oct. 1, 2015, 7 pages.
Non-Final Office Action for U.S. Appl. No. 14/287,812, dated Oct. 23, 2015, 9 pages.
Examination Report for European Patent Application No. 13814809.3, dated Apr. 29, 2016, 5 pages.
First Office Action for Chinese Patent Application 201380073247.X, dated May 17, 2016, 18 pages.
Examination Report for European Patent Application No. 13814810.1, dated May 24, 2016, 4 pages.
Communication under Rule 164(2)(a) EPC for European Patent Application No. 13821549.6, dated May 2, 2016, 4 pages.
Examination Report for European Patent Application No. 13821550.4, dated May 2, 2016, 4 pages.
Examination Report for European Patent Application No. 13821552.0, dated May 2, 2016, 4 pages.
International Search Report for International Patent Application No. PCT/US2016/024426, dated Jun. 23, 2016, 11 pages.
Examination Report for European Patent Application No. 13818895.8, dated Mar. 11, 2016, 3 pages.
Final Office Action for U.S. Appl. No. 14/292,286, dated Apr. 14, 2016, 16 pages.
Notice of Allowance for U.S. Appl. No. 14/292,363, dated Apr. 4, 2016, 7 pages.
Non-Final Office Action for U.S. Appl. No. 14/498,168, dated Mar. 29, 2016, 15 pages.
Non-Final Office Action for U.S. Appl. No. 14/498,119, dated Mar. 18, 2016, 21 pages.
Non-Final Office Action for U.S. Appl. No. 14/498,219, dated Apr. 15, 2016, 17 pages.
Non-Final Office Action for U.S. Appl. No. 14/498,197, dated Apr. 26, 2016, 21 pages.
Notice of Allowance for U.S. Appl. No. 14/681,846, dated Apr. 19, 2016, 7 pages.
Notice of Allowance for U.S. Appl. No. 13/782,068, dated Jun. 3, 2016, 7 pages.
Non-Final Office Action for U.S. Appl. No. 13/868,021, dated Jun. 27, 2016, 9 pages.
Non-Final Office Action for U.S. Appl. No. 14/588,762, dated Jun. 23, 2016, 12 pages.
Non-Final Office Action for U.S. Appl. No. 14/725,687, dated Jun. 30, 2016, 18 pages.
Advisory Action for U.S. Appl. No. 14/292,286, dated Jun. 20, 2016, 3 pages.
Final Office Action for U.S. Appl. No. 14/292,332, dated May 12, 2016, 21 pages.
Final Office Action for U.S. Appl. No. 14/287,812, dated May 6, 2016, 11 pages.
Non-Final Office Action for U.S. Appl. No. 14/498,147, dated May 24, 2016, 15 pages.
Notice of Allowance for U.S. Appl. No. 13/782,096, dated Sep. 26, 2016, 10 pages.
First Office Action for Chinese Patent Application No. 2013800733453, dated Aug. 3, 2016, 23 pages.
Non-Final Office Action for U.S. Appl. No. 14/292,286, dated Oct. 6, 2016, 15 pages.
Non-Final Office Action for U.S. Appl. No. 14/292,332, dated Oct. 6, 2016, 20 pages.
Non-Final Office Action for U.S. Appl. No. 14/287,812, dated Sep. 27, 2016, 13 pages.
Final Office Action for U.S. Appl. No. 14/498,147, dated Sep. 8, 2016, 14 pages.
Examination Report for European Patent Application No. 13814809.3, dated Oct. 14, 2016, 5 pages.
Examination Report for European Patent Application No. 13814810.1, dated Oct. 14, 2016, 4 pages.
Decision on Appeal for U.S. Appl. No. 13/782,096, dated Jul. 8, 2016, 14 pages.
Notice of Allowance for U.S. Appl. No. 14/292,363, dated Jul. 21, 2016, 8 pages.
Final Office Action for U.S. Appl. No. 14/498,168, dated Jul. 27, 2016, 14 pages.
Advisory Action for U.S. Appl. No. 14/292,332, dated Jul. 14, 2016, 3 pages.
Final Office Action for U.S. Appl. No. 14/498,119, dated Aug. 16, 2016, 15 pages.
Advisory Action for U.S. Appl. No. 14/287,812, dated Jul. 14, 2016, 3 pages.
Final Office Action for U.S. Appl. No. 14/498,197, dated Aug. 11, 2016, 22 pages.
Final Office Action for U.S. Appl. No. 14/498,219, dated Jul. 27, 2016, 13 pages.
Examination and Search Report for European Patent Application No. 13821549.6, dated Aug. 24, 2016, 7 pages.
International Preliminary Report on Patentability for PCT/US2015/010050, dated Jul. 21, 2016, 7 pages.
English Translation of Notice of Reason(s) for Rejection for Japanese Patent Application No. 2015-549572, dated Oct. 18, 2016, 5 pages.
International Preliminary Report on Patentability for PCT/US2015/032431, dated Dec. 15, 2016, 9 pages.
Final Office Action for U.S. Appl. No. 13/868,021, dated Nov. 25, 2016, 11 pages.
Final Office Action for U.S. Appl. No. 14/588,762, dated Dec. 30, 2016, 18 pages.

(56) References Cited

OTHER PUBLICATIONS

Final Office Action for U.S. Appl. No. 14/725,687, dated Nov. 1, 2016, 14 pages.
Notice of Allowance for U.S. Appl. No. 14/292,363, dated Nov. 4, 2016, 8 pages.
Advisory Action and Examiner-Initiated Interview Summary for U.S. Appl. No. 14/498,168, dated Dec. 8, 2016, 5 pages.
Advisory Action and Examiner-Initiated Interview Summary for U.S. Appl. No. 14/498,119, dated Dec. 8, 2016, 5 pages.
Advisory Action and Examiner-Initiated Interview Summary for U.S. Appl. No. 14/498,147, dated Nov. 29, 2016, 4 pages.
Advisory Action and Examiner-Initiated Interview Summary for U.S. Appl. No. 14/498,197, dated Dec. 8, 2016, 4 pages.
Advisory Action and Examiner-Initiated Interview Summary for U.S. Appl. No. 14/498,219, dated Dec. 8, 2016, 4 pages.
Second Office Action for Chinese Patent Application No. 201380073247.X, dated Dec. 21, 2016, 14 pages.
Examination Report for European Patent Application No. 13821550.4, dated Feb. 13, 2017, 5 pages.
Second Office Action for Chinese Patent Application No. 201380073345.3, dated Dec. 30, 2016, 16 pages.
Digeronimo, John, "Search Report," EIC 2800, Tracking No. 533769, Scientific & Technical Information Center, Feb. 1, 2017, 16 pages.
Advisory Action for U.S. Appl. No. 13/868,021, dated Jan. 31, 2017, 2 pages.
Non-Final Office Action for U.S. Appl. No. 13/868,021, dated Mar. 3, 2017, 18 pages.
Advisory Action and Applicant-Initiated Interview Summary for U.S. Appl. No. 14/588,762, dated Mar. 3, 2017, 6 pages.
Advisory Action for U.S. Appl. No. 14/725,687, dated Feb. 15, 2017, 3 pages.
Non-Final Office Action for U.S. Appl. No. 14/498,168, dated Feb. 9, 2017, 15 pages.
Notice of Allowance for U.S. Appl. No. 14/292,332, dated Feb. 16, 2017, 8 pages.
Notice of Allowance and Examiner-Initiated Interview Summary for U.S. Appl. No. 14/498,119, dated Jan. 23, 2017, 10 pages.
Notice of Allowance and Examiner-Initiated Interview Summary for U.S. Appl. No. 14/498,147, dated Mar. 2, 2017, 11 pages.
Notice of Allowance for U.S. Appl. No. 14/498,197, dated Feb. 10, 2017, 9 pages.
Notice of Allowance and Examiner-Initiated Interview Summary for U.S. Appl. No. 14/498,219, dated Feb. 16, 2017, 13 pages.
Examination Report for European Patent Application No. 13814809.3, dated Apr. 7, 2017, 4 pages.
Notice of Reasons for Rejection for Japanese Patent Application No. 2015-549572, dated Apr. 25, 2017, 3 pages.
Third Office Action for Chinese Patent Application No. 201380073247.X, dated Apr. 6, 2017, 14 pages.
Examination Report for European Patent Application No. 13814810.1, dated Mar. 31, 2017, 6 pages.
Examination Report for European Patent Application No. 13821549.6, dated Apr. 6, 2017, 4 pages.
Examination Report for European Patent Application No. 15700917.6, dated Apr. 20, 2017, 5 pages.
First Office Action for Chinese Patent Application No. 201580012209.2, dated Mar. 16, 2017, 14 pages.
Examination Report for European Patent Application No. 13821550.4, dated Jun. 6, 2017, 5 pages.
Non-Final Office Action for U.S. Appl. No. 14/588,762, dated Apr. 6, 2017, 13 pages.
Non-Final Office Action for U.S. Appl. No. 14/725,687, dated Apr. 6, 2017, 16 pages.
Final Office Action for U.S. Appl. No. 14/292,286, dated Mar. 27, 2017, 17 pages.
Notice of Allowance for U.S. Appl. No. 14/498,168, dated May 24, 2017, 9 pages.
Final Office Action for U.S. Appl. No. 14/287,812, dated Apr. 20, 2017, 12 pages.
Notice of Allowance for U.S. Appl. No. 15/416,764, dated Jun. 6, 2017, 11 pages.
Final Office Action for U.S. Appl. No. 13/868,021, dated Jun. 8, 2017, 23 pages.
Advisory Action and Examiner-Initiated Interview Summary for U.S. Appl. No. 13/868,021, dated Aug. 29, 2017, 4 pages.
Non-Final Office Action for U.S. Appl. No. 13/868,021, dated Sep. 21, 2017, 23 pages.
Final Office Action for U.S. Appl. No. 14/588,762, dated Jul. 19, 2017, 17 pages.
Advisory Action and Applicant-Initiated Interview Summary for U.S. Appl. No. 14/588,762, dated Sep. 27, 2017, 5 pages.
Non-Final Office Action for U.S. Appl. No. 14/292,286, dated Jul. 28, 2017, 28 pages.
Notice of Allowance for U.S. Appl. No. 14/498,168, dated Sep. 5, 2017, 8 pages.
Examination Report for European Patent Application No. 13814809.3, dated Jul. 20, 2017, 5 pages.
Decision to Grant a Patent for Japanese Patent Application No. 2015-549572, dated Oct. 3, 2017, 4 pages.
Examination Report for European Patent Application No. 13814810.1, dated Jul. 20, 2017, 5 pages.
Notice of Reasons for Rejection for Japanese Patent Application No. 2015-549574, dated Aug. 22, 2017, 8 pages.
Examination Report for European Patent Application No. 13821549.6, dated Jul. 24, 2017, 4 pages.
First Office Action for Chinese Patent Application No. 201380066640.6, dated Jul. 20, 2017, 25 pages.
Examination Report for European Patent Application No. 13821029.9, dated Sep. 5, 2017, 5 pages.
Summons to Attend Oral Proceedings for European Patent Application No. 15700917.6, dated Sep. 15, 2017, 6 pages.
Office Action for German Patent Application No. 112015002545.6, dated Jul. 26, 2017, 12 pages.
Fourth Office Action for Chinese Patent Application No. 201380073247.X, dated Sep. 5, 2017, 14 pages.
Notice of Preliminary Rejection for Korean Patent Application No. 10-2015-7019152, dated Jul. 18, 2017, 10 pages.
Third Office Action for Chinese Patent Application No. 201380073345.3, dated Jun. 12, 2017, 13 pages.
Advisory Action and Examiner-Initiated Interview Summary for U.S. Appl. No. 14/292,286, dated Jun. 16, 2017, 4 pages.
Advisory Action for U.S. Appl. No. 14/287,812, dated Jul. 5, 2017, 3 pages.
First Office Action for Chinese Patent Application No. 201380073236.1, dated Aug. 9, 2017, 17 pages.
First Office Action for Chinese Patent Application No. 201380073252.0, dated Aug. 9, 2017, 12 pages.
Examination Report for European Patent Application No. 13821550.4, dated Oct. 16, 2017, 4 pages.
First Office Action for Chinese Patent Application No. 20138007328.0, dated Aug. 9, 2017, 21 pages.
Notification to Grant Patent Right for Invention for Chinese Patent Application No. 201580012209.2, dated Sep. 18, 2017, 4 pages.
International Preliminary Report on Patentability for PCT/US2016/024426, dated Oct. 19, 2017, 8 pages.
First Office Action for Chinese Patent Application No. 201380073301.0, dated Aug. 22, 2017, 14 pages.
Non-Final Office Action for U.S. Appl. No. 14/588,762, dated Dec. 20, 2017, 14 pages.
Advisory Action for U.S. Appl. No. 14/725,687, dated Nov. 16, 2017, 3 pages.
Final Office Action for U.S. Appl. No. 14/292,286, dated Nov. 28, 2017, 28 pages.
Notice of Preliminary Rejection for Korean Patent Application No. 10-2015-7019151, dated Oct. 20, 2017, 17 pages.
Notice of Allowance for Korean Patent Application No. 10-2015-7019152, dated Dec. 26, 2017, 2 pages. (No Translation).
Office Action for Japanese Patent Application No. 2015-549574, dated Dec. 19, 2017, 6 pages.

(56) References Cited

OTHER PUBLICATIONS

Result of Consultation for European Patent Application No. 15700917.6, dated Jan. 2, 2018, 3 pages.

* cited by examiner

LIGHT FIXTURES, SYSTEMS FOR CONTROLLING LIGHT FIXTURES, AND METHODS OF CONTROLLING FIXTURES AND METHODS OF CONTROLLING LIGHTING CONTROL SYSTEMS

FIELD OF THE INVENTIVE SUBJECT MATTER

The present inventive subject matter relates to light fixtures ("fixtures"), systems for controlling light fixtures ("lighting control systems"), methods of controlling fixtures, and methods of controlling lighting control systems. In some aspects, the present inventive subject matter relates to fixtures, lighting control systems, methods of controlling fixtures, and methods of controlling lighting control systems, in which brightnesses of light emitted from individual fixtures and/or groups of fixtures can be controlled in response to detected brightness(es), detected motion, manual controls, and/or other controls.

BACKGROUND

Currently, most new construction projects utilize simple switching or more with some use of occupancy sensing. Sophisticated and networked lighting control systems with daylight sensing, occupancy sensing, and centralized lighting control and management have traditionally been used on a very small percentage of projects.

Recently, however, the use of sophisticated control systems has been increasing. Energy codes, LEED certification, and utility demand-side management programs will drive more sophisticated controls into the majority of buildings in the near future.

BRIEF SUMMARY

Existing sophisticated and/or networked lighting control systems (including those that are marketed as being "simple") are typically very complex and time-consuming to install and implement. Expanded use of such systems would make the jobs of electrical engineers and electrical contractors increasingly more difficult because many additional steps are required during installation and implementation.

The present inventive subject matter relates to lighting control systems, fixtures and methods that can provide some or all of the features of sophisticated and/or networked systems, and which are easier to install or operate, and/or which can be configured to provide different properties that might be desired by different users.

The discussion below refers to a number of aspects of the present inventive subject matter and embodiments of the present inventive subject matter. The present inventive subject matter encompasses subject matter that includes any of these aspects and/or any of the features in such embodiments, as well as all possible combinations of these aspects and/or features.

In some aspects, the present inventive subject matter is directed to fixtures, lighting control systems, methods of controlling fixtures, and methods of controlling lighting control systems, that provide for simplified installation, implementation, use and/or adjustment. In some aspects of the present inventive subject matter, installation and implementation are as simple as selecting a single option from a fixture specification sheet, and/or installation and implementation are as time-consuming as with a conventional switched lighting system.

In some aspects of the present inventive subject matter, a lighting control system is provided that comprises two or more fixtures and at least one processor (which can be centralized, e.g., as a central processing unit (CPU), or which can be distributed). Such a lighting control system can optionally comprise any of a wide variety of components to enable the fixtures and the processor(s) to communicate with one another, e.g., one or more wireless gateways, wireless transmitters and receivers, ethernet cables, portable computing devices (e.g., smart phones, mobile phones, laptop computers, etc.) with one or more applications loaded thereon, etc. Persons of skill in the art are familiar with a wide variety of suitable ways to provide communication among electronic components (including identifying codes for specific components, e.g., each fixture in a system), and any of such ways can be employed. In the discussion that follows, wireless communication is referred to on many occasions, and it should be understood that in any situation in which wireless communication is described, other forms of communication (e.g., ethernet cables, fiber optic cables, USB cables, telephone wires, etc.) can be used instead.

In some aspects of the present inventive subject matter, each of one or more fixtures in a lighting control system comprises one or more light sources (e.g., one or more light emitting diodes, fluorescent lights, incandescent lights, thin film electroluminescent devices, light emitting polymers (LEPs), halogen lamps, high intensity discharge lamps, electron-stimulated luminescence lamps, etc.), a motion sensor, a light sensor, a wireless receiver and a wireless transmitter. In some aspects, each fixture in a system can have a unique identifier, e.g., a wireless address. In some situations, every fixture according to the present inventive subject matter within wireless range can be recognized as being part of a system (e.g., a consumer can purchase twenty fixtures and install four such fixtures in each of five rooms of a dwelling, and each will (when supplied with power) automatically communicate wirelessly with a single processor and be identified as a fixture within a lighting control system within the dwelling, and if new fixtures are purchased, the consumer can make sure that they are compatible with the lighting control system so that they will be recognized and identified as being within the lighting control system when they are installed and supplied with energy.

In some aspects, a system can include one or more fixtures that do not comprise a light source (e.g., for sensing motion in a location where a light source is not desired, or for sensing light level in a location where a light source is not desired (for instance, to sense only ambient light or ambient light plus light from nearby light sources, or to sense motion in a doorway or a hallway, e.g., in some cases to determine or assist in determining that a room or an area is vacant or that a person is leaving or entering a room or an area)).

As noted above, in some aspects of the present inventive subject matter, a lighting control system comprises a processor that can be centralized or distributed. In aspects where a centralized processor is provided, a fixture can function as a node in the network. In aspects where processing is distributed, processing can be distributed among any of the components in the system (e.g., each of one or more fixtures and/or other components can have a microprocessor). In the present specification, wherever "processor" is referred to in relation to a lighting control system, it should be understood to refer to a centralized processor and/or to a distributed processor, depending on how the lighting control system is configured.

In some aspects of the present inventive subject matter, a lighting control system is provided that comprises two or more fixtures and at least one processor, in which the lighting control system is configured such that upon actuation of a single actuator (e.g., a pushbutton), each of the fixtures in the lighting control system is assigned to a zone (i.e., in some instances, two or more zones might be identified, and each fixture is assigned to at least one of the zones). In some embodiments of the present inventive subject matter, each fixture comprises an actuator, and/or one or more actuators can be provided on a CPU (if included), a wireless gateway, in an application on a portable computing device.

The significance of fixtures being assigned to a zone can include any one or more of the following:

each fixture in the zone can be set to the same profile (discussed below);

when no motion is detected by any fixture in the zone, all the fixtures can be dimmed to a lower brightness;

the system can avoid one fixture in the zone having a brightness that differs by more than a desired amount relative to another fixture in the zone (or a ratio of the brightness of one to the brightness of another being too large);

one or more aspect of all of the fixtures in the zone (e.g., brightness or on/off) can be controlled by a single common control (e.g., a gateway switch or a mobile application).

In some embodiments of the present inventive subject matter, upon actuation of one or more actuators:

[1] the emission of light from each of the fixtures in the lighting control system (i.e., each that comprises one or more light sources) is dropped to a low level (e.g., 10 percent of maximum), then

[2] each fixture that comprises one or more light sources is flashed (in a preset order or in random order) to a higher level (e.g., 90 percent of maximum), and light sensors on each fixture detect the change in light level resulting from the flashing of each fixture, and

[3] based on the respective light levels detected by each fixture resulting from the respective flashing of each fixture, and based on the specific fixture assignment algorithm being run by the processor (for identifying zones and assigning fixtures to those zones), one or more zones are identified by the processor, and each fixture is assigned to one (or at least one) of these zones.

The expression "flashing of each fixture" or "flashing the fixture" or the like refers to increasing the level of light being emitted by one or more light sources in the fixture and/or turning on one or more of such light sources, such that the level of light being emitted from the fixture increases (if desired, during such brightening, the level of light emitted by some light sources in the fixture can be decreased and/or some light sources in the fixture can be turned off, so long as the combined amount of light emitted by the fixture increases), and then decreasing the level of light being emitted by one or more light sources in the fixture and/or turning off one or more of such light sources, such that the level of light being emitted from the fixture decreases (if desired, during such dimming, the level of light emitted by some fixtures can be increased and/or some fixtures can be turned on, so long as the combined amount of light emitted by the fixture decreases). Similarly, any reference herein to light emitted from a fixture (or the like) refers to light emitted from one or more light sources in that fixture.

Similarly, the expression "dimming of each fixture" or "dimming the fixture" or the like refers to decreasing the level of light being emitted by one or more light sources in the fixture and/or turning off one or more of such light sources, such that the level of light being emitted from the fixture decreases (if desired, during such dimming, the level of light emitted by some fixtures can be increased and/or some fixtures can be turned on, so long as the combined amount of light emitted by the fixture decreases). Dimming can be accomplished in any suitable way, a variety of which are familiar to persons of skill in the art, e.g., one or more light sources can be turned off, current through one or more light sources can be decreased, the duty cycle (and/or pulse width) of electricity (e.g., in a waveform) supplied to one or more light sources can be reduced, and/or the waveform of electricity supplied to one or more light sources can be altered in some other way.

The expression "extent of dimming" or the like (or an expression in terms of a percentage of maximum) refers to a comparison between the brightness of light being emitted by a fixture (or a light source) relative to a baseline (e.g., as a ratio or in terms of a decrease by a quantity of lumens) (or relative to one or more baselines), i.e., 100 percent of maximum does not necessarily mean the maximum brightness that can be emitted by a fixture, and instead it means equal to a baseline brightness. For instance, an expression "dimmed to ten percent" (or "dim to ten percent") means that a fixture is dimmed so that the total brightness emitted by the fixture is ten percent of a baseline brightness (or to dim the fixture to such an extent). Analogously, brighten to 100 percent means increasing the brightness emitted by a fixture from a brightness lower than a baseline value (i.e., the fixture was previously dimmed) to a brightness equal to the baseline value. As indicated above, this can be accomplished by increasing the brightness from each of a plurality of light sources in the fixture equally or by increasing the aggregate brightness emitted by the fixture with the change in each individual light source in the fixture not being the same. An expression "dimmed brightness" or the like means that the fixture is emitting light of a brightness that is less than the baseline brightness.

The expression "dim at a rate" or the like refers to a rate at which the brightness of light emitted by a fixture (or a light source) is decreased, e.g., based on a brightness measurement (decrease by a particular quantity of lumens in a particular duration of time) or based on a ratio of brightness (decrease by a particular percentage relative to a baseline value in a particular duration of time).

The expression "light level" or the like refers to the brightness of light emitted by a fixture (or a light source). A light level could be characterized in terms of a percentage of a baseline value and/or in terms of lumens or other measurement of brightness.

Also, as noted herein, in some embodiments, a fixture (or one or more fixtures) can comprise no light source; any statement herein that pertains in any way to light being emitted from fixtures (e.g., "the flashing of each fixture") does not pertain to a fixture (or fixtures) that does not comprise any light source.

Any suitable algorithm for identifying zones and assigning fixtures to zones can be employed (and if desired, a lighting control system can have two or more of such algorithms, and the use of any particular algorithm can be prompted by a manual command or an automatic command based on any suitable parameter (e.g., a particular time of day, a particular level of sensed ambient light, etc.). One representative example of a suitable algorithm is an algorithm that finds an arrangement having a minimum number of zones, in which for each zone, the flashing of each fixture in that zone causes at least an increase in brightness (of a particular percentage or a particular amount (lumens)) to be detected by the respective light sensor in each of the other fixtures in that zone. In other words, in such a representative example of a suitable algorithm, where the requirement to include two fixtures in the same zone is that the flashing of each fixture in that zone must cause at least an increase in brightness of at least 300 lumens to be detected by the respective light sensor in each of the other fixtures in that zone, and where a lighting control system might have twenty fixtures, a processor might assign fixtures 1, 3, 5, 7, 9, 11 and 13 to a first zone, assign fixtures 2, 6, 10, 16, 18 and 20 to a second zone, and assign fixtures 4, 8, 12, 14, 15, 17 and 19 to a third zone, after determining that:

upon flashing any of fixtures 1, 3, 5, 7, 8, 11 and 13 from 10 percent of maximum to 90 percent of maximum, each of the other fixtures among fixtures 1, 3, 5, 7, 8, 11 and 13 registers an increase in brightness of at least 300 lumens, upon flashing any of fixtures 2, 6, 10, 16, 18 and 20 from 10 percent of maximum to 90 percent of maximum, each of the other fixtures among fixtures 2, 6, 10, 16, 18 and 20 registers an increase in brightness of at least 300 lumens, upon flashing any of fixtures 4, 8, 12, 14, 15, 17 and 19 from 10 percent of maximum to 90 percent of maximum, each of the other fixtures among fixtures 4, 8, 12, 14, 15, 17 and 19 registers an increase in brightness of at least 300 lumens, and any other assignment of fixtures to zones (that satisfies the requirement that the flashing of each light source in that zone causes at least an increase in brightness of at least 300 lumens to be detected by the respective light sensor in each of the other fixtures in that zone) would require designation of at least four zones.

Any statement herein to the effect that a fixture "registers an increase in brightness" of a particular quantity or ratio, or the like, refers to a detection of light by a light sensor (or two or more light sensors) on that fixture.

Likewise, any statement herein to the effect that a fixture "detects motion" (or the like), refers to a detection of motion by a motion sensor (or two or more motion sensors) on that fixture.

As noted above, persons of skill in the art can readily identify an infinite number of suitable algorithms that could be employed for the assignment of fixtures to zones, and any of such algorithms can be employed in the present inventive subject matter. For instance, in some situations, two or more zone assignment schemes might satisfy the requirements, and/or one or more fixture might be capable of being included in any of two or more zones. In such instances, the algorithm can comprise any suitable way of resolving such conflict, e.g., for any fixture in conflict, selecting the zone that includes the fixture whose flashing produced the highest increase or increases in lumens in the fixture (and/or assigning a fixture in conflict to the zone that includes a fixture that has the lowest numerical wireless address, and/or assigning a fixture in conflict at random to one of the zones in which its inclusion does not violate any other requirement of the algorithm).

In some aspects of the present inventive subject matter, any fixture in a system is assigned to one and only one zone (permanently or at any given time). In other aspects of the present inventive subject matter, it can be possible in some situations for a fixture to be assigned to more than one zone—in such situations, one or more algorithms might be included in order to dictate how that (or those) fixture(s) would react when the two or more zones issue conflicting commands.

In some aspects of the present inventive subject matter, a fixture that is assigned to a particular zone can be reassigned to another zone automatically (e.g., the lighting control system can be configured to automatically repeat the zone assignment algorithm at regular intervals or upon the occurrence of any particular event, e.g., the addition of a new fixture to the region), or manually (e.g., an actuator in a fixture in the lighting control system is actuated, a control in a processor (e.g., a CPU that a facility manager can access (directly or indirectly, e.g., directly inputting commands into a computer that is functioning as a CPU, inputting commands into a computer that is linked by wire connection to a computer that is functioning as a CPU, into a computer that communicates wirelessly with a computer that is functioning as a CPU, etc.), a control in a wireless gateway, a control in a portable computing device, a control in a wireless switch, etc.). For example, in some embodiments, a smart phone (or other mobile or desktop device) can include an application that enables a user to indicate a desire to reassign a fixture to a different zone; and upon receiving such an indication, the application can provide a prompt (e.g., an image on the smart phone that says "shine a light at the light sensor on the fixture(s) to be reassigned"); the user can then shine a flashlight (or other lighting device) at the light sensor of the fixture to be reassigned; the application can them provide a prompt "e.g., "shine a light at a light sensor on a fixture in the zone to which the fixture(s) is/are to be reassigned"; the user can then shine a flashlight (or other lighting device) at a light sensor of a fixture that is in the zone to which the fixture is to be reassigned; the output from the fixture(s) of the zone to which the fixture has been reassigned can then be pulsed between 50 percent of maximum and 100 percent of maximum and the application can provide a prompt, e.g., "is fixture correctly associated"; and the user can then select "OK" on the application.

In some embodiments in which a fixture can be reassigned to another zone, the lighting control system is capable of being set so the fixture returns to the previously assigned zone (or any other desired zone) after passage of a particular amount of time (or upon the occurrence of a particular event).

In some aspects of the present inventive subject matter, one or more fixtures can be pre-programmed, e.g., to react in a particular way to specific information received from a motion sensor on the fixture and/or a light sensor on the fixture (e.g., when the light source or light sources is/are on, if no motion is detected by that fixture for a particular period of time, the fixture can be dimmed to a particular degree; if motion is later detected by that fixture, the fixture can be returned to its original level of light output (i.e., brightness, in lumens), and/or if a particular level of light is detected or exceeded, the fixture can be dimmed). In some embodiments according to such aspects, any such pre-programming is superseded (permanently or temporarily, as desired) when the fixture receives one or more contrary signals from the processor.

In some aspects of the present inventive subject matter, one or more fixture can be "self-calibrating", i.e., for each self-calibrating fixture, when the fixture is first turned on (and/or after it is first assigned to a zone, as discussed above), it is illuminated over at least one twenty-four hour period (continuously or intermittently, i.e., it can remain on the entire twenty-four hour period (or periods), or it can be on and off in a present pattern, e.g., on for one minute and off for four minutes, etc.), the level of light at a light sensor for the fixture can be detected over one or more twenty-four hour periods (at times when the light source in the fixture is illuminated), and the level of light (detected by the light sensor on the fixture) during the three-hour period (of the twenty-four hour period of sensing, or during the same three hours of the day during each of the two or more twenty-four hour periods of sensing) during which the average level of light is the lowest, is set as the baseline level, and the fixture is controlled so as to maintain the level of light at the light sensor at the baseline during all times that the light source is on, e.g., a light sensor on a fixture can sense the amount of light being received in order to determine if the light source in that fixture should be dimmed down due to the presence or magnitude of daylight. For instance, in a representative hypothetical example, suppose that a newly installed fixture is turned on at 90 percent of maximum, and maintained at 90 percent of maximum for a twenty-four hour period, and between the hours of 2 am and 5 am, the lowest average level of light was detected; as a result, the baseline was be sent at that lowest average level of light; then, at 3 pm the following day (or some subsequent day), suppose that the light sensor for the fixture receives a significant amount of sunlight; as a result, the light source in the fixture would be controlled to be at less than 90 percent of maximum (in order to compensate for the sunlight at that location, i.e., so that the light level detected at the light sensor for the fixture is the same as its average during the night (between 2 and 5 am) while it was receiving little or no ambient light and the light source in the fixture was operating at 90 percent of maximum). In some embodiments, one or more fixtures can be automatically re-calibrated at regular intervals (e.g., as the seasons change) or automatically upon the occurrence of any particular event (e.g., the addition of a new fixture to the region), or manually (e.g., using a control in a processor (such as a CPU that a facility manager can access), a control in a wireless gateway, a control in a portable computing device, a control in a wireless switch, etc.).

As noted above, in some aspects of the present inventive subject matter, one or more fixtures can be pre-programmed to react in a particular way when no motion is detected by the motion sensor on that fixture for a particular period of time, and/or when motion is later detected by that motion sensor. Different users (e.g., different types of businesses, people with different types of responsibilities in a single business, people with the same types of responsibilities in a single business but different personal preferences, different residents, etc., might prefer or require different responses to such detection of lack of motion (and/or to detection of motion following a period of a lack of detected motion). In some situations, such variation in preferences can be characterized in terms of differing tolerance to nuisance. For instance, if no motion is detected and the light source(s) in one or more fixtures is/are turned off, occupants in the area can be annoyed by being surprisingly dropped into reduced light or darkness. Setting or controlling a system to require a longer period of time of no detected motion before dimming a light source or turning off a light source reduces the energy savings provided by such controls. In order to address these concerns, in some aspects of the present inventive subject matter, one or more fixtures is/are pre-programmed to dim at a particular dimming rate when no motion is detected by the motion sensor on that fixture for a particular period of time, the dimming rate in some embodiments being slow enough that the dimming is imperceptible or nearly imperceptible, and when motion is again detected, to reverse the dimming (i.e., to gradually increase the brightness emitted by the light source) at a particular brightening rate, the brightening rate in some embodiments being slow enough that the dimming is imperceptible or nearly imperceptible (e.g., at a rate that is comparable to, or the same as, the dimming rate). In some embodiments, the rate of dimming (and/or the rate of brightening) can be increased where no motion is detected by the light sensor or any fixture in an entire zone.

In some aspects of the present inventive subject matter, a lighting control system can have a system-wide profile (or a profile that applies to the fixtures in one or more zones) that limits the extent to which any desired lighting characteristics can be adjusted, and/or the degree to which any such characteristics can vary from one fixture in the system to another. For instance, in some embodiments, a lighting control system can have two or more selectable profiles (e.g., three profiles, including: maximum energy savings, balanced energy savings and conservative energy savings), in which the profile that is selected controls (1) the rate at which fixtures are dimmed (e.g., not noticeable, barely noticeable, very noticeable) when they are being dimmed as a result of no motion being detected, (2) the lowest light level down to which fixtures can be dimmed as a result of no motion being detected) (e.g., down to 5 percent of maximum, down to 30 percent of maximum, down to 70 percent of maximum), (3) the rate at which fixtures are dimmed (e.g., not noticeable, barely noticeable, very noticeable) when they are being dimmed as a result of a particular level of light being detected (e.g., when the level of ambient light changes quickly, for instance, when a cloud or other obstruction suddenly blocks sunlight), (4) the lowest light level down to which fixtures can be dimmed as a result of a particular level of light being detected (e.g., down to 5 percent of maximum, down to 30 percent of maximum, down to 70 percent of maximum), and/or (5) the maximum difference between the light levels of any two fixtures in a zone (or the maximum ratio of the light level of any fixture in a zone to the light level of any other fixture in that zone). In some embodiments, there can be provided the capability for a profile to be set for an entire system, and/or there can be provided the capability for different zones and/or groups of zones to be independently set to profiles, e.g., one profile can be set for one or more zones in a system and the same or another profile can be set for one or more other zones in the system. In some embodiments or instances, there can be provided the capability to override a profile setting for one or more zones and/or for one or more fixtures, e.g., the profile for one or more fixtures (and/or one or more zones) can be adjusted automatically upon the occurrence of any particular event, or manually (e.g., using a control in a processor (e.g., a CPU that a facility manager can access), a control in a wireless gateway, a control in a portable computing device, a control in a wireless switch, etc.). In embodiments in which the capability to override a profile setting is provided, the duration for which such an adjustment will remain valid can be programmed, and/or there can be provided the capability to set the duration for which such an adjustment will remain valid, or such an adjustment can remain in effect until some other event occurs that induces a change in a profile setting.

In some aspects of the present inventive subject matter, there can be provided the capability to override a setting for one or more individual fixtures (or for groups of two or more fixtures), e.g., the light level for one or more fixtures can be adjusted manually (e.g., using a control in a processor (e.g., a CPU that a facility manager can access), a control in a wireless gateway, a control in a portable computing device, a control in a wireless switch, etc.). For example, in some embodiments, a smart phone (or other mobile or desktop device) can include an application that enables a user to indicate a desire to adjust a setting (e.g., light level) for a fixture (or group of fixtures); and upon receiving such an indication, the application can provide a prompt (e.g., "shine a light at the light sensor on the fixture(s) to be adjusted"); the user can then shine a flashlight (or other lighting device) at the light sensor of the fixture to be adjusted; the user can then select "OK" on the application; the application can them provide a prompt "e.g., "select a desired light level"; and the user can then select the desired level on the application.

In some aspects of the present inventive subject matter, there can be provided the capability to override a setting for one or more individual fixtures using light that is detected by one or more light sensors on the fixture (or fixtures). For instance, in some aspects of the present inventive subject matterinv, if a sensor for a particular fixture detects light of a brightness that is in excess of a particular set brightness level (e.g., higher than would normally be detected if all lights in the vicinity were at maximum brightness and ambient light is as high as it normally ever gets), that fixture could dim at a particular rate and (so long as the light of a brightness that is in excess of the set brightness level continues to be detected) continue to dim all the way down and then (so long as light of a brightness that is in excess of the set brightness level continues to be detected), with no delay or with a delay for a set period of time, the fixture could then increase in brightness and continue (so long as light of a brightness that is in excess of the set brightness level continues to be detected) to increase in brightness until it reaches maximum brightness, and continue to loop (i.e., dim and increase in brightness) until the light sensor ceases to detect light of a brightness that is in excess of the particular set brightness level (which could occur in the initial dimming or at any time thereafter), at which time the fixture would stay (at least temporarily, e.g., for the rest of the day or until the facilities manager resets it) at the brightness it was when the light sensor ceased detecting light of a brightness that exceeded the particular set brightness level. With a fixture, system or method according to such an aspect of the present inventive subject matter, a user could, for instance, shine a flashlight (or other light) at a fixture (the flashlight having a brightness that is large enough that a light sensor on the fixture will detect a brightness in excess of a set brightness level) to cause the fixture to begin to loop (sequentially dim and brighten) and stop shining the flashlight at the fixture when the fixture is at a desired brightness level, to set the fixture at that brightness level.

In some aspects of the present inventive subject matter, other adjustments could be made by causing a particular fixture to detect light of a brightness that is in excess of a particular set brightness level, e.g., by shining a flashlight (or other light) at the fixture.

In some aspects of the present inventive subject matter, one or more adjustments could be made by causing a particular fixture to detect light of a specific color hue (e.g., monochromatic light). For instance, when a light sensor on a fixture detects red light, the fixture could begin to loop (sequentially dim and brighten), and the fixture could be caused to set (at least temporarily) at a desired brightness by discontinuing causing the light sensor to detect red light.

A variety of related controls could be provided, e.g.:
a fixture goes into a particular mode if a light sensor on the fixture detects light of a brightness in excess of a set brightness level for at least a set period of time (e.g., five seconds);
a fixture goes back to a "normal" mode if a light sensor on the fixture detects a set number (e.g., two) of bursts of light in excess of a set brightness level, with each burst being of a duration that is less than a set duration (e.g., one second), and the bursts are spaced from each other by a duration that is less than a set duration (e.g., two seconds);
a fixture goes into different modes if a light sensor on the fixture detects light of several different color hues.

With regard to fixtures that can be controlled by causing a light sensor on the fixture to sense light of a particular color (or more than one particular colors, there can be provided a light (e.g., a flashlight) that emits light in that color (or those colors), e.g., a flashlight that has one or more red LEDs, one or more green LEDs and/or one or more blue LEDs, with suitable controls to make a selection so that only the LEDs of one color are illuminated, or any combination of LEDs of two or more colors are illuminated, and/or one or more color filters or colored cellophane sheets can be provided that can be selectively oriented relative to a light so as to generate light of the particular color hue (or hues) that can be used to control the fixture (e.g., to cause the fixture to go into a particular mode of operation).

In embodiments in which the capability to override a setting for an individual fixture (or groups of two or more fixtures) is provided, the duration for which such an adjustment will remain valid can be programmed (e.g., only for the rest of that day), and/or there can be provided the capability to set the duration for which such an adjustment will remain valid, or such an adjustment can remain in effect until some other event occurs that induces a change in the setting for that fixture (or those fixtures).

In some aspects of the present inventive subject matter, there is provided a fixture that comprises at least a first actuator configured to, when actuated, cause the fixture to be assigned to at least one zone.

In some aspects of the present inventive subject matter, there is provided a fixture configured to detect a sequence of light brightness measurement values at the first light sensor over a time-span of at least twenty-four hours, each light brightness measurement value comprising a value corresponding to a light brightness at the first light sensor. In some of such embodiments, which can include or not include, as suitable, any of the other features described herein, the fixture can be configured to identify at least a first period of time that is of a first duration and that has the smallest average light brightness of any period of said first duration during said time-span.

In some aspects of the present inventive subject matter, there is provided a fixture configured to dim at a first rate when at least a first motion sensor senses no motion for at least a designated period of time.

In some aspects of the present inventive subject matter, there is provided a fixture configured to initiate dimming when at least a first motion sensor senses no motion for at least a designated period of time, said dimming to continue to not less than a designated percentage unless motion is detected by at least one motion sensor during said dimming.

In some aspects of the present inventive subject matter, there is provided a lighting control system comprising at least first and second fixtures and an actuator configured to, when actuated, cause the first fixture to be assigned to at least one zone and the second fixture to be assigned to at least one zone.

In some aspects of the present inventive subject matter, there is provided a lighting control system, comprising a first fixture comprising a wireless transmitter configured to transmit wireless signals to a processor, and a second fixture comprising a wireless receiver configured to receive wireless signals from the first processor.

In some aspects of the present inventive subject matter, there is provided a lighting control system configured to assign a profile to at least two fixtures.

In some aspects of the present inventive subject matter, there is provided a method that comprises detecting a sequence of light brightness measurement values at a first light sensor of a first fixture over a time-span of at least twenty-four hours.

In some aspects of the present inventive subject matter, there is provided a method that comprises identifying at least a first period of time that is of a first duration and that has the smallest average light brightness of any period of said first duration during a time-span.

In some aspects of the present inventive subject matter, there is provided a method that comprises assigning a first profile to at least a first fixture and a second fixture.

In a first aspect of the present inventive subject matter, there is provided a fixture comprising:
  at least a first light sensor; and
  at least a first actuator configured to, when actuated, cause the fixture to be assigned to at least one zone:

In some embodiments according to the first aspect of the present inventive subject matter, which can include or not include, as suitable, any of the other features described herein, the fixture further comprises at least a first light source. In some of such embodiments, which can include or not include, as suitable, any of the other features described herein:
  the first actuator is configured to, when actuated, cause the fixture to be illuminated and then dimmed,
  the first actuator is configured to, when actuated, cause the fixture to be illuminated to a first brightness and then dimmed to a second brightness, the second brightness not greater than about 25 percent of the first brightness, and/or
  the second brightness is between no light and about one percent of the first brightness.

In some embodiments according to the first aspect of the present inventive subject matter, which can include or not include, as suitable, any of the other features described herein, the fixture further comprises at least a first motion sensor.

In some embodiments according to the first aspect of the present inventive subject matter, which can include or not include, as suitable, any of the other features described herein, the fixture further comprises at least one wireless transmitter.

In some embodiments according to the first aspect of the present inventive subject matter, which can include or not include, as suitable, any of the other features described herein, the fixture further comprises at least one wireless receiver.

In some embodiments according to the first aspect of the present inventive subject matter, which can include or not include, as suitable, any of the other features described herein, the fixture further comprises at least one microprocessor.

In some embodiments according to the first aspect of the present inventive subject matter, which can include or not include, as suitable, any of the other features described herein, the fixture is pre-programmed. In some of such embodiments, which can include or not include, as suitable, any of the other features described herein:
  the fixture further comprises at least a first motion sensor, and the fixture is pre-programmed to dim if no motion is detected by the first motion sensor for at least a first length of time, and/or
  the fixture is pre-programmed to dim if the first light sensor detects a brightness in excess of a first light brightness.

In some embodiments according to the first aspect of the present inventive subject matter, which can include or not include, as suitable, any of the other features described herein:
  the fixture further comprises at least a first light source, and
  the first light source is a solid state light emitter.

In a second aspect of the present inventive subject matter, there is provided a fixture comprising:
  at least a first light source;
  at least a first motion sensor; and
  at least a first light sensor.

In some embodiments according to the second aspect of the present inventive subject matter, which can include or not include, as suitable, any of the other features described herein, the fixture further comprises at least one wireless transmitter.

In some embodiments according to the second aspect of the present inventive subject matter, which can include or not include, as suitable, any of the other features described herein, the fixture further comprises at least one wireless receiver.

In some embodiments according to the second aspect of the present inventive subject matter, which can include or not include, as suitable, any of the other features described herein, the fixture further comprises at least a first actuator configured to, when actuated, cause the fixture to be assigned to at least one zone. In some of such embodiments, which can include or not include, as suitable, any of the other features described herein:
  the first actuator is configured to, when actuated, cause the fixture to be illuminated and then dimmed,
  the first actuator is configured to, when actuated, cause the first fixture to be illuminated to a first brightness and then dimmed to a second brightness, the second brightness not greater than about 25 percent of the first brightness, and/or
  the second brightness is between no light and about one percent of the first brightness.

In some embodiments according to the second aspect of the present inventive subject matter, which can include or not include, as suitable, any of the other features described herein, the fixture further comprises at least one microprocessor.

In some embodiments according to the second aspect of the present inventive subject matter, which can include or not include, as suitable, any of the other features described herein, the fixture is pre-programmed. In some of such embodiments, which can include or not include, as suitable, any of the other features described herein:
  the fixture is pre-programmed to dim if no motion is detected by the first motion sensor for at least a first length of time, and/or
  the fixture is pre-programmed to dim if the first light sensor detects a brightness in excess of a first light brightness.

In some embodiments according to the second aspect of the present inventive subject matter, which can include or not include, as suitable, any of the other features described herein, the first light source is a solid state light emitter.

In a third aspect of the present inventive subject matter, there is provided a fixture comprising:
at least a first motion sensor;
at least a first light sensor; and
at least one wireless transmitter.

In some embodiments according to the third aspect of the present inventive subject matter, which can include or not include, as suitable, any of the other features described herein, the fixture further comprises at least one wireless receiver.

In some embodiments according to the third aspect of the present inventive subject matter, which can include or not include, as suitable, any of the other features described herein, the fixture further comprises at least a first actuator configured to, when actuated, cause the fixture to be assigned to at least one zone. In some of such embodiments, which can include or not include, as suitable, any of the other features described herein:
the fixture further comprises at least a first light source, and the first actuator is configured to, when actuated, cause the fixture to be illuminated and then dimmed,
the fixture further comprises at least a first light source, and the first actuator is configured to, when actuated, cause the first fixture to be illuminated to a first brightness and then dimmed to a second brightness, the second brightness not greater than about 25 percent of the first brightness, and/or
the second brightness is between no light and about one percent of the first brightness.

In some embodiments according to the third aspect of the present inventive subject matter, which can include or not include, as suitable, any of the other features described herein, the fixture further comprises at least one microprocessor.

In some embodiments according to the third aspect of the present inventive subject matter, which can include or not include, as suitable, any of the other features described herein, the fixture is pre-programmed. In some of such embodiments, which can include or not include, as suitable, any of the other features described herein:
the fixture is pre-programmed to dim if no motion is detected by the first motion sensor for at least a first length of time, and/or
the fixture is pre-programmed to dim if the first light sensor detects a brightness in excess of a first light brightness.

In some embodiments according to the third aspect of the present inventive subject matter, which can include or not include, as suitable, any of the other features described herein:
the fixture further comprises at least a first light source, and
the first light source is a solid state light emitter.

In a fourth aspect of the present inventive subject matter, there is provided a fixture comprising:
at least a first light source; and
at least a first light sensor,
the fixture configured to:
detect a sequence of light brightness measurement values at the first light sensor over a time-span of at least twenty-four hours, each light brightness measurement value comprising a value corresponding to a light brightness at the first light sensor, and
identify at least a first period of time that is of a first duration and that has the smallest average light brightness of any period of said first duration during said time-span.

In some embodiments according to the fourth aspect of the present inventive subject matter, which can include or not include, as suitable, any of the other features described herein, the fixture is configured to also dim the fixture when the brightness at the first light sensor exceeds the smallest average light brightness after the time-span.

In some embodiments according to the fourth aspect of the present inventive subject matter, which can include or not include, as suitable, any of the other features described herein, the fixture is configured to also dim the fixture to maintain the brightness at the first light sensor at about the smallest average light brightness, during at least one time period that is after the time-span.

In some embodiments according to the fourth aspect of the present inventive subject matter, which can include or not include, as suitable, any of the other features described herein, the fixture is configured to detect a sequence of light brightness measurement values over a time-span of at least twenty-four hours, each light brightness measurement value comprising a value corresponding to a light brightness at the first light sensor, said time-span occurring during the first forty-eight hours after the fixture is first supplied with power.

In a fifth aspect of the present inventive subject matter, there is provided a fixture comprising:
at least a first light source,
the fixture configured to dim at a first rate when at least a first motion sensor senses no motion for at least a designated period of time.

In some embodiments according to the fifth aspect of the present inventive subject matter, which can include or not include, as suitable, any of the other features described herein, the designated period of time is five seconds.

In some embodiments according to the fifth aspect of the present inventive subject matter, which can include or not include, as suitable, any of the other features described herein, the designated period of time is three minutes.

In some embodiments according to the fifth aspect of the present inventive subject matter, which can include or not include, as suitable, any of the other features described herein, the designated period of time is ten minutes.

In some embodiments according to the fifth aspect of the present inventive subject matter, which can include or not include, as suitable, any of the other features described herein, the fixture is also configured to permit the designated period of time to be altered.

In some embodiments according to the fifth aspect of the present inventive subject matter, which can include or not include, as suitable, any of the other features described herein, the first motion sensor is on the fixture.

In some embodiments according to the fifth aspect of the present inventive subject matter, which can include or not include, as suitable, any of the other features described herein, the first rate is not greater than ten percent every three seconds.

In some embodiments according to the fifth aspect of the present inventive subject matter, which can include or not include, as suitable, any of the other features described herein, the first rate is not greater than ten percent every ten seconds.

In some embodiments according to the fifth aspect of the present inventive subject matter, which can include or not include, as suitable, any of the other features described herein, the fixture is also configured to permit the first rate to be altered.

In some embodiments according to the fifth aspect of the present inventive subject matter, which can include or not include, as suitable, any of the other features described herein, the fixture is configured to dim, at said first rate when at least said first motion sensor senses no motion for at least a designated period of time, to not less than a designated percentage. In some of such embodiments, which can include or not include, as suitable, any of the other features described herein:

the designated percentage is ten percent (or forty percent, or seventy percent), and/or the fixture is also configured to permit the designated percentage to be altered.

In some embodiments according to the fifth aspect of the present inventive subject matter, which can include or not include, as suitable, any of the other features described herein, the fixture is further configured to brighten at a second rate when the fixture is at a dimmed brightness and at least one motion sensor detects motion. In some of such embodiments, which can include or not include, as suitable, any of the other features described herein, the fixture is configured to brighten at said second rate back to one hundred percent brightness when the fixture is at a dimmed brightness and said at least one motion sensor detects motion.

In some embodiments according to the fifth aspect of the present inventive subject matter, which can include or not include, as suitable, any of the other features described herein, the fixture is further configured to brighten at a second rate when the fixture is at a dimmed brightness and the first motion sensor detects motion.

In a sixth aspect of the present inventive subject matter, there is provided a fixture comprising:

at least a first light source, the fixture configured to initiate dimming when at least a first motion sensor senses no motion for at least a designated period of time, said dimming to continue to not less than a designated percentage unless motion is detected by at least one motion sensor during said dimming.

In some embodiments according to the sixth aspect of the present inventive subject matter, which can include or not include, as suitable, any of the other features described herein, the designated percentage is ten percent.

In some embodiments according to the sixth aspect of the present inventive subject matter, which can include or not include, as suitable, any of the other features described herein, the designated percentage is forty percent.

In some embodiments according to the sixth aspect of the present inventive subject matter, which can include or not include, as suitable, any of the other features described herein, the designated percentage is seventy percent.

In some embodiments according to the sixth aspect of the present inventive subject matter, which can include or not include, as suitable, any of the other features described herein, the fixture is also configured to permit the designated percentage to be altered.

In some embodiments according to the sixth aspect of the present inventive subject matter, which can include or not include, as suitable, any of the other features described herein, the designated period of time is five seconds.

In some embodiments according to the sixth aspect of the present inventive subject matter, which can include or not include, as suitable, any of the other features described herein, the designated period of time is three minutes.

In some embodiments according to the sixth aspect of the present inventive subject matter, which can include or not include, as suitable, any of the other features described herein, the designated period of time is ten minutes.

In some embodiments according to the sixth aspect of the present inventive subject matter, which can include or not include, as suitable, any of the other features described herein, the fixture is also configured to permit the designated period of time to be altered.

In some embodiments according to the sixth aspect of the present inventive subject matter, which can include or not include, as suitable, any of the other features described herein, the first motion sensor is on the fixture.

In some embodiments according to the sixth aspect of the present inventive subject matter, which can include or not include, as suitable, any of the other features described herein, the fixture is further configured to brighten, when the fixture is at a dimmed brightness and at least one motion sensor detects motion. In some of such embodiments, which can include or not include, as suitable, any of the other features described herein, the fixture is configured to brighten back to one hundred percent brightness when the fixture is at a dimmed brightness and said at least one motion sensor detects motion.

In a seventh aspect of the present inventive subject matter, there is provided a lighting control system, comprising:

at least a first fixture and a second fixture; and at least a first actuator, the first fixture comprising at least a first light sensor, the second fixture comprising at least a second light sensor, the first actuator configured to, when actuated, cause the first fixture to be assigned to at least one zone and the second fixture to be assigned to at least one zone.

In some embodiments according to the seventh aspect of the present inventive subject matter, which can include or not include, as suitable, any of the other features described herein, the first actuator is on the first fixture.

In some embodiments according to the seventh aspect of the present inventive subject matter, which can include or not include, as suitable, any of the other features described herein:

each fixture in the system has at least one actuator, and each actuator in the system is configured to, when actuated, cause each fixture in the system to be assigned to at least one zone (i.e., if any actuator in the system is actuated (i.e., if the actuator on any fixture in the system is actuated), all of the fixtures in the system get assigned to at least one zone). In some of such embodiments, which can include or not include, as suitable, any of the other features described herein:

each actuator in the system is configured to, when actuated, cause each fixture in the system to be at a dimmed light level, and then one-by-one, each fixture in the system is brightened and then dimmed (i.e., if any actuator in the system is actuated, each fixtures in the system is (in sequence or in random order) flashed (i.e., the brightness of light emitted by the fixture is increased and then decreased, e.g., from ten percent to 100 percent and then back to ten percent)), and/or the lighting control system is configured to assign the first and second fixtures to different zones if (1) brightness detected by the first light sensor is less than a first brightness when the second fixture is illuminated, and/or (2) brightness detected by the second light sensor is less than said first brightness when the first fixture is illuminated.

In some embodiments according to the seventh aspect of the present inventive subject matter, which can include or not include, as suitable, any of the other features described herein:

the first fixture further comprises at least a first light source, and the second fixture further comprises at least a second light source. In some of such embodiments, which can include or not include, as suitable, any of the other features described herein:

the first actuator is configured to, when actuated, cause the first fixture to be assigned to at least one zone and the second fixture to be assigned to at least one zone, and the second actuator is configured to, when actuated, cause the first fixture to be assigned to at least one zone and the second fixture to be assigned to at least one zone, the first actuator is configured to, when actuated, cause each fixture in the system to be at a dimmed light level, then cause the brightness of light emitted by the first fixture to be increased and then decreased, and then cause the brightness of the second fixture to be increased and then decreased, the lighting control system is configured to assign the first and second fixtures to different zones if (1) brightness detected by the first light sensor is less than a first brightness when the second fixture is flashed, and/or (2) brightness detected by the second light sensor is less than said first brightness when the first fixture is flashed, the first actuator is on the first fixture, and a second actuator is on the second fixture, (1) the first actuator is on the first fixture, (2) a second actuator is on the second fixture, (3) the first actuator is configured to, when actuated, cause the first fixture to flash, and cause the second fixture to flash, (4) the second actuator is configured to, when actuated, cause the first fixture to flash, and cause the second fixture to flash, and/or each fixture in the system has at least one actuator, and each actuator in the system is configured to, when actuated, cause each fixture in the system to flash.

In some embodiments according to the seventh aspect of the present inventive subject matter, which can include or not include, as suitable, any of the other features described herein:

the system further comprises at least a first processor, and the first actuator is on the processor.

In some embodiments according to the seventh aspect of the present inventive subject matter, which can include or not include, as suitable, any of the other features described herein:

the system further comprises at least a first wireless gateway, and
the first actuator is on the processor.

In an eighth aspect of the present inventive subject matter, there is provided a lighting control system, comprising:

at least a first fixture and a second fixture; and
at least a first processor,
the first fixture comprising at least a first light sensor and at least a first wireless transmitter,
the second fixture comprising at least a first light source and at least a first wireless receiver,
the first wireless transmitter configured to transmit wireless signals to the first processor,
the first wireless receiver configured to receive wireless signals from the first processor.

In a ninth aspect of the present inventive subject matter, there is provided a lighting control system, comprising:

at least a first fixture and a second fixture; and the lighting control system configured to assign to at least the first fixture and the second fixture a first profile selected from among at least two profiles, each of the at least two profiles comprising:
a limit on the highest rate at which fixtures can be dimmed as a result of no motion being detected,
a limit on the lowest light level down to which fixtures can be dimmed as a result of no motion being detected,
a limit on the highest rate at which fixtures can be dimmed as a result of a particular level of light being detected,
a limit on the lowest light level down to which light sources can be dimmed as a result of a particular level of light being detected, and/or
a limit on the maximum difference between the light level of the first fixture and the light level of the second fixture.

In some embodiments according to the ninth aspect of the present inventive subject matter, which can include or not include, as suitable, any of the other features described herein, the lighting control system is configured:

to have selections made to indicate that the profile is to be changed for a fixture, and
to allow a fixture to be selected by shining at least one lighting device toward the fixture.

In some embodiments according to the ninth aspect of the present inventive subject matter, which can include or not include, as suitable, any of the other features described herein, the lighting control system is configured:

to have selections made to indicate that the profile is to be changed for a zone comprising at least one fixture, and
to allow a first zone to be selected by shining at least one lighting device toward a fixture in the first zone.

In some embodiments according to the ninth aspect of the present inventive subject matter, which can include or not include, as suitable, any of the other features described herein, the lighting control system is configured to have at least one selection made to indicate that the profile is to be changed for the lighting control system.

In some embodiments according to the ninth aspect of the present inventive subject matter, which can include or not include, as suitable, any of the other features described herein, the first fixture and the second fixture are both in a first zone.

In some embodiments according to the ninth aspect of the present inventive subject matter, which can include or not include, as suitable, any of the other features described herein, the lighting control system is configured to assign a profile to the entire lighting control system, the lighting control system comprising the first fixture, the second fixture and at least a third fixture. In some of such embodiments, which can include or not include, as suitable, any of the other features described herein, the lighting control system comprises at least two zones, and at least one fixture is in each of the zones.

In some embodiments according to the ninth aspect of the present inventive subject matter, which can include or not include, as suitable, any of the other features described herein:

the lighting control system is configured:
to assign each fixture to at least one zone, and
to assign a profile to each zone.

In some embodiments according to the ninth aspect of the present inventive subject matter, which can include or not include, as suitable, any of the other features described herein:

the lighting control system is configured to assign a profile to each fixture in the lighting control system.

In a tenth aspect of the present inventive subject matter, there is provided a method, comprising:

actuating a first actuator on a first fixture in a lighting control system, thereby causing the first fixture and at least a second fixture in the lighting control system to each be assigned to at least one zone.

In some embodiments according to the tenth aspect of the present inventive subject matter, which can include or not include, as suitable, any of the other features described herein:

the first fixture comprises at least a first light source and at least a first light sensor, the second fixture comprises at least a second light source and at least a second light sensor, and said actuating said first actuator:

causes the first fixture to be illuminated and then dimmed, and causes the second fixture to be illuminated and then dimmed.

In some embodiments according to the tenth aspect of the present inventive subject matter, which can include or not include, as suitable, any of the other features described herein, said actuating said first actuator causes every fixture in the system to be assigned to at least one zone.

In some embodiments according to the tenth aspect of the present inventive subject matter, which can include or not include, as suitable, any of the other features described herein, said actuating said first actuator causes every fixture in the system that comprises at least one light source to be illuminated and then dimmed.

In some embodiments according to the tenth aspect of the present inventive subject matter, which can include or not include, as suitable, any of the other features described herein, said actuating said first actuator causes every fixture in the system that comprises at least one light source to be illuminated to a first brightness and then dimmed to a second brightness, the second brightness not greater than about 25 percent of the first brightness.

In an eleventh aspect of the present inventive subject matter, there is provided a method, comprising:

shining at least one lighting device toward a first fixture in a first zone in a lighting control system, thereby selecting the first fixture to be moved from the first zone.

In some embodiments according to the eleventh aspect of the present inventive subject matter, which can include or not include, as suitable, any of the other features described herein, the method further comprises shining at least one lighting device toward a second fixture in a second zone in the lighting control system, thereby causing the first fixture to be changed from the first zone to the second zone.

In a twelfth aspect of the present inventive subject matter, there is provided a method, comprising:

detecting a sequence of light brightness measurement values at a first light sensor of a first fixture over a time-span of at least twenty-four hours, each light brightness measurement value comprising a value corresponding to a light brightness at the first light sensor, and identifying at least a first period of time that is of a first duration and that has the smallest average light brightness of any period of said first duration during said time-span.

In some embodiments according to the twelfth aspect of the present inventive subject matter, which can include or not include, as suitable, any of the other features described herein, the method further comprises dimming the fixture when the brightness at the first light sensor exceeds the smallest average light brightness after the time-span.

In some embodiments according to the twelfth aspect of the present inventive subject matter, which can include or not include, as suitable, any of the other features described herein, the method further comprises dimming the fixture to maintain the brightness at the first light sensor at about the smallest average light brightness, during at least one time period that is after the time-span.

In some embodiments according to the twelfth aspect of the present inventive subject matter, which can include or not include, as suitable, any of the other features described herein, the method further comprises detecting a sequence of light brightness measurement values over a time-span of at least twenty-four hours, each light brightness measurement value comprising a value corresponding to a light brightness at the first light sensor, said time-span occurring during the first forty-eight hours after the fixture is first supplied with power.

In a thirteenth aspect of the present inventive subject matter, there is provided a method, comprising dimming a fixture at a first rate when at least a first motion sensor senses no motion for at least a designated period of time.

In some embodiments according to the thirteenth aspect of the present inventive subject matter, which can include or not include, as suitable, any of the other features described herein, the first motion sensor is on the fixture.

In some embodiments according to the thirteenth aspect of the present inventive subject matter, which can include or not include, as suitable, any of the other features described herein, said dimming comprises dimming the fixture at said first rate when at least said first motion sensor senses no motion for at least a designated period of time, to not less than a designated percentage.

In some embodiments according to the thirteenth aspect of the present inventive subject matter, which can include or not include, as suitable, any of the other features described herein, the method further comprises brightening the fixture at a second rate when the fixture is at a dimmed brightness and at least one motion sensor detects motion.

In a fourteenth aspect of the present inventive subject matter, there is provided a method, comprising dimming a fixture to not less than a designated percentage when at least a first motion sensor senses no motion for at least a designated period of time.

In some embodiments according to the fourteenth aspect of the present inventive subject matter, which can include or not include, as suitable, any of the other features described herein, the first motion sensor is on the fixture.

In some embodiments according to the fourteenth aspect of the present inventive subject matter, which can include or not include, as suitable, any of the other features described herein, the fixture is further configured to brighten, when the fixture is at a dimmed brightness and at least one motion sensor detects motion.

In a fifteenth aspect of the present inventive subject matter, there is provided a method comprising:

assigning to at least a first fixture and a second fixture a first profile selected from among at least two profiles, the first fixture and the second fixture both in a lighting control system, each of the at least two profiles comprising:

a limit on the highest rate at which fixtures can be dimmed as a result of no motion being detected, a limit on the lowest light level down to which fixtures can be dimmed as a result of no motion being detected, a limit on the highest rate at which fixtures can be dimmed as a result of a particular level of light being detected, a limit on the lowest light level down to which light sources can be dimmed as a result of a particular level of light being detected, and/or a limit on the maximum difference between the light level of the first fixture and the light level of the second fixture.

In some embodiments according to the fifteenth aspect of the present inventive subject matter, which can include or not include, as suitable, any of the other features described herein, the method further comprises:

making selections to indicate that the profile is to be changed for a fixture, and selecting a fixture by shining at least one lighting device toward the fixture.

In some embodiments according to the fifteenth aspect of the present inventive subject matter, which can include or not include, as suitable, any of the other features described herein, the method further comprises:

making selections to indicate that the profile is to be changed for a zone comprising at least one fixture, and selecting a first zone by shining at least one lighting device toward a fixture in the first zone.

In some embodiments according to the fifteenth aspect of the present inventive subject matter, which can include or not include, as suitable, any of the other features described herein, the method further comprises making at least one selection to indicate that the profile is to be changed for the lighting control system.

In some embodiments according to the fifteenth aspect of the present inventive subject matter, which can include or not include, as suitable, any of the other features described herein, the first fixture and the second fixture are both in a first zone.

In some embodiments according to the fifteenth aspect of the present inventive subject matter, which can include or not include, as suitable, any of the other features described herein, the method further comprises assigning a profile to the entire lighting control system, the lighting control system comprising the first fixture, the second fixture and at least a third fixture. In some of such embodiments, which can include or not include, as suitable, any of the other features described herein, the lighting control system comprises at least two zones, and at least one fixture is in each of the zones.

In some embodiments according to the fifteenth aspect of the present inventive subject matter, which can include or not include, as suitable, any of the other features described herein, the method comprises assigning each fixture to at least one zone, and assigning a profile to each zone.

In some embodiments according to the fifteenth aspect of the present inventive subject matter, which can include or not include, as suitable, any of the other features described herein, the method comprises assigning a profile to each fixture in the lighting control system.

The inventive subject matter may be more fully understood with reference to the accompanying drawings and the following detailed description of the inventive subject matter.

BRIEF DESCRIPTION OF THE DRAWING FIGURES

DETAILED DESCRIPTION

Figure 1:
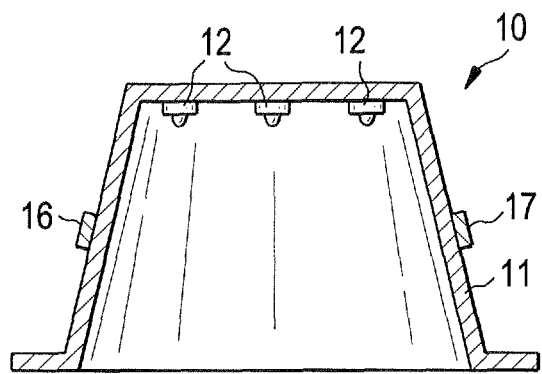
FIG. 1 is a schematic sectional view of a fixture 10 according to the present inventive subject matter.

The present inventive subject matter now will be described more fully hereinafter with reference to the accompanying drawings, in which embodiments of the inventive subject matter are shown. However, this inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" another element, it can be in or on the other element, and/or it can be directly on the other element, and/or it can extend directly onto the other element, and it can be in direct contact or indirect contact with the other element (e.g., intervening elements may also be present). In contrast, if an element is referred to herein as being "directly on" another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Relative terms, such as "bottom", may be used herein to describe an orientation and/or one element's relationship to another element (or to other elements), e.g., as illustrated in the Figures. Such relative terms are intended to encompass different orientations of the device in addition to the orientation depicted in the Figures and/or as described herein. For example, if a device is turned over, elements described as being on the "bottom" side (or below other elements) would then be oriented on the "top" side (or above other elements).

The expression "lighting device", as used herein, is not limited, except that it indicates that the device is capable of emitting light.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As noted above, various aspects of the present inventive subject matter comprise and/or employ one or more light sources.

Persons of skill in the art are familiar with, and have access to, a wide variety of light sources, and any suitable light sources can be employed in accordance with the present inventive subject matter. Representative examples of types of light sources include incandescent lights, fluorescent lamps, solid state light emitters (e.g., light emitting diodes (inorganic or organic, including polymer light emitting diodes (PLEDs)), luminescent materials, and combinations (e.g., one or more light emitting diodes and/or one or more luminescent materials), laser diodes, thin film electroluminescent devices, light emitting polymers (LEPs), halogen lamps, high intensity discharge lamps, electron-stimulated luminescence lamps, etc., with or without filters. Fixtures that comprise two or more light sources can comprise a plurality of light sources of a particular type, or any combination of one or more light sources of each of two or more types. Light sources can be one or more of a variety of shapes, sizes and arrangements (e.g., A lamps, B-10 lamps, BR lamps, C-7 lamps, C-15 lamps, ER lamps, F lamps, G lamps, K lamps, MB lamps, MR lamps, PAR lamps, PS lamps, R lamps, S lamps, S-11 lamps, T lamps, Linestra 2-base lamps, AR lamps, ED lamps, E lamps, BT lamps, Linear fluorescent lamps, U-shape fluorescent lamps, circline fluorescent lamps, single twin tube compact fluorescent lamps, double twin tube compact fluorescent lamps, triple twin tube compact fluorescent lamps, A-line compact fluorescent lamps, screw twist compact fluorescent lamps, globe screw base compact fluorescent lamps, reflector screw base compact fluorescent lamps, etc). Light sources can be supplied with energy in any suitable way (e.g., with an Edison connector, a battery connection, a GU24 connector, direct wiring to a branch circuit, etc.). Light sources can be selected from among those designed so as to serve any of a variety of functions (e.g., as a flood light, as a spotlight, as a downlight, etc.), and/or for residential, commercial or other applications.

Light sources within a single fixture can be arranged in any suitable way, and fixtures within a lighting control system can be arranged in any suitable way.

As noted above, various aspects of the present inventive subject matter comprise and/or employ one or more light sensors. Persons of skill in the art are familiar with, and have access to, a wide variety of light sensors, and any of such sensors can be employed in the fixtures and the methods of the present inventive subject matter. Among these well known sensors are sensors that are sensitive to all visible light, as well as sensors that are sensitive to only a portion of visible light. By using a sensor that monitors output selectively (by color), the output of one color can be selectively controlled to maintain the proper ratios of outputs and thereby maintain the color output of the device. One or more light sensors (when employed) can be mounted in or on fixtures in any suitable way and at any suitable location(s) in or on the fixtures.

As noted above, various aspects of the present inventive subject matter comprise and/or employ one or more motion sensors. Persons of skill in the art are familiar with, and have access to, a wide variety of motion sensors, and any of such motion sensors can be employed in the fixtures and methods according to the present inventive subject matter. One or more motion sensors (when employed) can be mounted in or on fixtures in any suitable way and at any suitable location(s) in or on the fixtures.

As noted above, various aspects of the present inventive subject matter comprise and/or employ one or more wireless transmitters and/or one or more wireless receivers. Persons of skill in the art are familiar with, and have access to, a wide variety of wireless transmitters and wireless receivers, and any of such wireless transmitters and wireless receivers (including components that can function both as a wireless transmitter and as a wireless receiver) can be employed in the fixtures and methods according to the present inventive subject matter. One or more wireless transmitters and/or one or more wireless receivers (when employed) can be mounted in or on fixtures in any suitable way and at any suitable location(s) in or on the fixtures.

As noted above, various aspects of the present inventive subject matter comprise and/or employ one or more processors. Persons of skill in the art are familiar with, and have access to, a wide variety of processors, and any of such processors can be employed in the systems and methods according to the present inventive subject matter. One or more processors (when employed) can be positioned in or on fixtures in any suitable way and at any suitable location(s).

As noted above, various aspects of the present inventive subject matter comprise and/or employ one or more actuators. Persons of skill in the art are familiar with, and have access to, a wide variety of actuators (e.g., manual actuators, such as push-buttons, levers, etc., and signal actuators that enable selections to be made and relayed by sending signals, e.g., infrared signal remote controllers, smart phones running applications that enable virtual selections to be made, computers running software that enable selections to be made on line, regions of touch screens, etc.), and any of such actuators can be employed in the fixtures and methods according to the present inventive subject matter. One or more actuators (when employed) can be provided in or on one or more fixtures, in or on one or more processors, in or on one or more wireless gateways, in one or more applications run on a portable computing device, etc.

The present inventive subject matter can optionally comprise and/or employ one or more housings, trim elements, accessories, mounting structures, enclosing structures, etc. Persons of skill in the art are familiar with, and have access to, a wide variety of such structures, and any of such structures can be employed as desired.

The present inventive subject matter can optionally comprise and/or employ one or more heat management structures and/or schemes. Persons of skill in the art are familiar with, and have access to, a wide variety of such structures and schemes, and any of such structures and/or schemes can be employed as desired.

The present inventive subject matter comprise and/or employ one or more lenses, diffusers or light control elements, etc. Persons of skill in the art are familiar with, and have access to, a wide variety of lenses, diffusers or light control elements, and any of such lenses, diffusers or light control elements can be employed in the present inventive subject matter. One or more lenses, diffusers or light control elements (when employed) can be mounted in any suitable way and at any suitable location(s).

Embodiments in accordance with the present inventive subject matter are described herein in detail in order to provide exact features of representative embodiments that are within the overall scope of the present inventive subject matter. The present inventive subject matter should not be understood to be limited to such detail.

Embodiments in accordance with the present inventive subject matter are also described with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as being limited to the particular shapes of regions illustrated herein but are to include deviations in shapes that result, for example, from manufacturing. Thus, the regions illustrated in the figures are schematic in nature and their shapes are not intended to illustrate the precise shape of a region of a device and are not intended to limit the scope of the present inventive subject matter.

Figure 2:
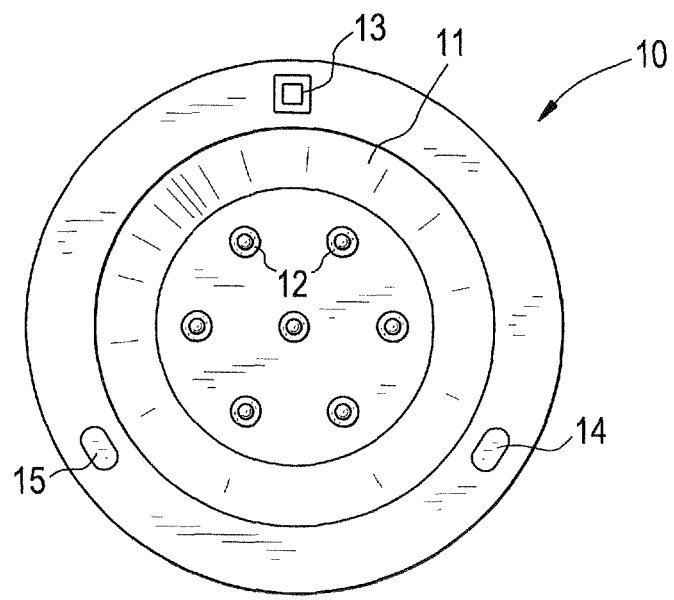
FIG. 2 is a schematic bottom view of the fixture 10 depicted in FIG. 1.

FIG. 1 is a schematic sectional view of a fixture 10 according to the present inventive subject matter, and FIG. 2 is a schematic bottom view of the fixture 10. Referring to FIGS. 1 and 2, the fixture 10 comprises a housing 11, a plurality of light sources 12, an actuator 13, a light sensor 14, a motion sensor 15, a wireless transmitter 16 and a wireless receiver 17.

Figure 3:
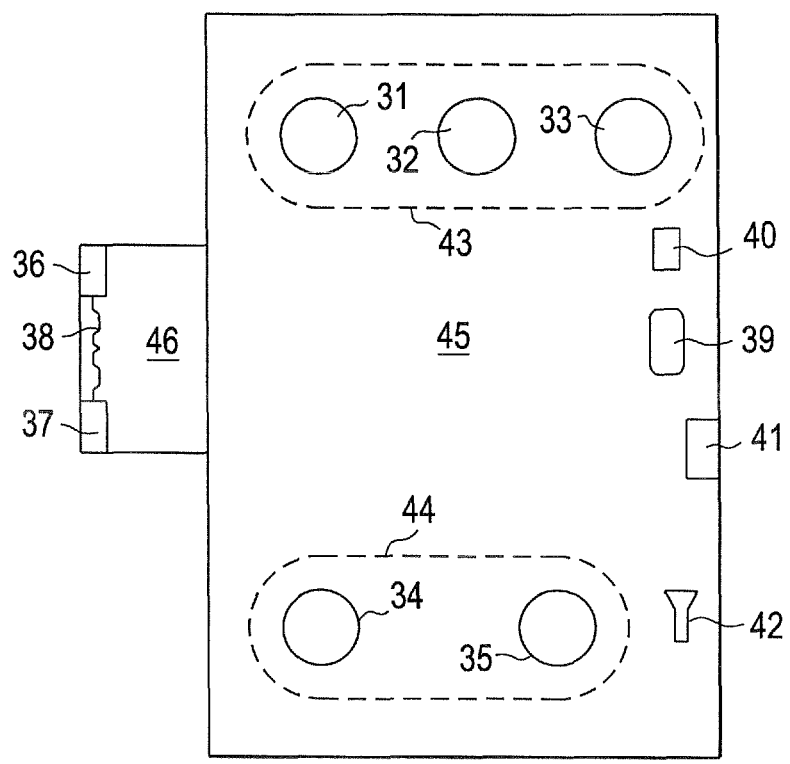
FIG. 3 is a schematic overhead view of a pair of rooms (comprising a first room 45 and a second room 46) in which there is provided a lighting control system according to the present inventive subject matter

FIG. 3 is a schematic overhead view of a pair of rooms (comprising a first room 45 and a second room 46) in which there is provided a lighting control system according to the present inventive subject matter, the lighting control system comprising a first fixture 31, a second fixture 32, a third fixture 33, a fourth fixture 34, a fifth fixture 35, a processor 36, a wireless gateway 37, and an ethernet cable 38. There are also depicted in FIG. 3 a portable computer 39, a smart phone 40, a wireless switch 41 and a lighting device 42 (in the form of a flashlight). In the lighting control system depicted in FIG. 3, the first fixture 31, the second fixture 32, and the third fixture 33 are in a first zone 43, while the fourth fixture 34 and the fifth fixture 35 are in a second zone 44.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Below are a series of numbered passages, each of which defines subject matter within the scope of the present inventive subject matter:

Passage 1. A fixture comprising:
at least a first light sensor; and
at least a first actuator configured to, when actuated, cause the fixture to be assigned to at least one zone.

Passage 2. A fixture as recited in Passage 1, wherein the fixture further comprises at least a first light source.

Passage 3. A fixture as recited in Passage 2, wherein the first actuator is configured to, when actuated, cause the fixture to be illuminated and then dimmed.

Passage 4. A fixture as recited in Passage 2, wherein the first actuator is configured to, when actuated, cause the fixture to be illuminated to a first brightness and then dimmed to a second brightness, the second brightness not greater than about 25 percent of the first brightness.

Passage 5. A fixture as recited in Passage 4, wherein the second brightness is between no light and about one percent of the first brightness.

Passage 6. A fixture as recited in Passage 1, wherein the fixture further comprises at least a first motion sensor.

Passage 7, A fixture as recited in Passage 1, wherein the fixture further comprises at least one wireless transmitter.

Passage 8. A fixture as recited in Passage 1, wherein the fixture further comprises at least one wireless receiver.

Passage 9. A fixture as recited in Passage 1, wherein the fixture further comprises at least one microprocessor.

Passage 10. A fixture as recited in Passage 1, wherein the fixture is pre-programmed.

Passage 11. A fixture as recited in Passage 10, wherein:
the fixture further comprises at least a first motion sensor, and
the fixture is pre-programmed to dim if no motion is detected by the first motion sensor for at least a first length of time.

Passage 12. A fixture as recited in Passage 10, wherein the fixture is pre-programmed to dim if the first light sensor detects a brightness in excess of a first light brightness.

Passage 13. A fixture as recited in Passage 1, wherein:
the fixture further comprises at least a first light source, and
the first light source is a solid state light emitter.

Passage 14. A fixture as recited in Passage 1, wherein:
the fixture begins to dim when the first sensor detects light of a brightness that is in excess of a particular set brightness level.

Passage 15. A fixture as recited in Passage 1, wherein:
the fixture begins to vary in brightness of light emission when the first sensor detects light of a brightness that is in excess of a particular set brightness level and continues to vary in brightness of light emission until the first sensor ceases to detect light of a brightness that is in excess of the particular set brightness level.

Passage 16. A fixture as recited in Passage 1, wherein:
the fixture begins to dim when the first sensor detects light of one or more particular set color hues.

Passage 17. A fixture comprising:
at least a first light source;
at least a first motion sensor; and
at least a first light sensor.

Passage 18. A fixture as recited in Passage 17, wherein the fixture further comprises at least one wireless transmitter.

Passage 19. A fixture as recited in Passage 17, wherein the fixture further comprises at least one wireless receiver.

Passage 20. A fixture as recited in Passage 17, wherein the fixture further comprises at least a first actuator configured to, when actuated, cause the fixture to be assigned to at least one zone.

Passage 21. A fixture as recited in Passage 20, wherein the first actuator is configured to, when actuated, cause the fixture to be illuminated and then dimmed.

Passage 22. A fixture as recited in Passage 20, wherein the first actuator is configured to, when actuated, cause the first fixture to be illuminated to a first brightness and then dimmed to a second brightness, the second brightness not greater than about 25 percent of the first brightness.

Passage 23. A fixture as recited in Passage 22, wherein the second brightness is between no light and about one percent of the first brightness.

Passage 24. A fixture as recited in Passage 17, wherein the fixture further comprises at least one microprocessor.

Passage 25. A fixture as recited in Passage 17, wherein the fixture is pre-programmed.

Passage 26. A fixture as recited in Passage 25, wherein the fixture is pre-programmed to dim if no motion is detected by the first motion sensor for at least a first length of time.

Passage 27. A fixture as recited in Passage 25, wherein the fixture is pre-programmed to dim if the first light sensor detects a brightness in excess of a first light brightness.

Passage 28. A fixture as recited in Passage 17, wherein the first light source is a solid state light emitter.

Passage 29. A fixture comprising:
at least a first motion sensor;
at least a first light sensor; and
at least one wireless transmitter.

Passage 30. A fixture as recited in Passage 29, wherein the fixture further comprises at least one wireless receiver.

Passage 31. A fixture as recited in Passage 29, wherein the fixture further comprises at least a first actuator configured to, when actuated, cause the fixture to be assigned to at least one zone.

Passage 32. A fixture as recited in Passage 31, wherein:
the fixture further comprises at least a first light source; and
the first actuator is configured to, when actuated, cause the fixture to be illuminated and then dimmed.

Passage 33. A fixture as recited in Passage 31, wherein:
the fixture further comprises at least a first light source; and
the first actuator is configured to, when actuated, cause the first fixture to be illuminated to a first brightness and then dimmed to a second brightness, the second brightness not greater than about 25 percent of the first brightness.

Passage 34. A fixture as recited in Passage 33, wherein the second brightness is between no light and about one percent of the first brightness.

Passage 35. A fixture as recited in Passage 29, wherein the fixture further comprises at least one microprocessor.

Passage 36. A fixture as recited in Passage 29, wherein the fixture is pre-programmed.

Passage 37. A fixture as recited in Passage 36, wherein the fixture is pre-programmed to dim if no motion is detected by the first motion sensor for at least a first length of time.

Passage 38. A fixture as recited in Passage 36, wherein the fixture is pre-programmed to dim if the first light sensor detects a brightness in excess of a first light brightness.

Passage 39. A fixture as recited in Passage 29, wherein:
the fixture further comprises at least a first light source, and
the first light source is a solid state light emitter.

Passage 40. A fixture comprising:
at least a first light source; and
at least a first light sensor,
the fixture configured to:
detect a sequence of light brightness measurement values at the first light sensor over a time-span of at least twenty-four hours, each light brightness measurement value comprising a value corresponding to a light brightness at the first light sensor, and
identify at least a first period of time that is of a first duration and that has the smallest average light brightness of any period of said first duration during said time-span.

Passage 41. A fixture as recited in Passage 40, wherein the fixture is configured to also dim the fixture when the brightness at the first light sensor exceeds the smallest average light brightness after the time-span.

Passage 42. A fixture as recited in Passage 40, wherein the fixture is configured to also dim the fixture to maintain the brightness at the first light sensor at about the smallest average light brightness, during at least one time period that is after the time-span.

Passage 43. A fixture as recited in Passage 40, wherein the fixture is configured to detect a sequence of light brightness measurement values over a time-span of at least twenty-four hours, each light brightness measurement value comprising a value corresponding to a light brightness at the first light sensor, said time-span occurring during the first forty-eight hours after the fixture is first supplied with power.

Passage 44. A fixture comprising:
at least a first light source,
the fixture configured to dim at a first rate when at least a first motion sensor senses no motion for at least a designated period of time.

Passage 45. A fixture as recited in Passage 44, wherein the designated period of time is five seconds.

Passage 46. A fixture as recited in Passage 44, wherein the designated period of time is five minutes.

Passage 47. A fixture as recited in Passage 44, wherein the designated period of time is ten minutes.

Passage 48. A fixture as recited in Passage 44, wherein the fixture is also configured to permit the designated period of time to be altered.

Passage 49. A fixture as recited in Passage 44, wherein the first motion sensor is on the fixture.

Passage 50. A fixture as recited in Passage 44, wherein the first rate is not greater than ten percent every three seconds.

Passage 51. A fixture as recited in Passage 44, wherein the first rate is not greater than ten percent every ten seconds.

Passage 52. A fixture as recited in Passage 44, wherein the fixture is also configured to permit the first rate to be altered.

Passage 53. A fixture as recited in Passage 44, wherein the fixture is configured to dim, at said first rate when at least said first motion sensor senses no motion for at least a designated period of time, to not less than a designated percentage.

Passage 54. A fixture as recited in Passage 53, wherein the designated percentage is ten percent.

Passage 55. A fixture as recited in Passage 53, wherein the designated percentage is forty percent.

Passage 56. A fixture as recited in Passage 53, wherein the designated percentage is seventy percent.

Passage 57. A fixture as recited in Passage 53, wherein the fixture is also configured to permit the designated percentage to be altered.

Passage 58. A fixture as recited in Passage 44, wherein the fixture is further configured to brighten at a second rate when the fixture is at a dimmed brightness and at least one motion sensor detects motion.

Passage 59. A fixture as recited in Passage 58, wherein the fixture is configured to brighten at said second rate back to one hundred percent brightness when the fixture is at a dimmed brightness and said at least one motion sensor detects motion.

Passage 60. A fixture as recited in Passage 44, wherein the fixture is further configured to brighten at a second rate when the fixture is at a dimmed brightness and the first motion sensor detects motion.

Passage 61. A fixture comprising:
at least a first light source,
the fixture configured to initiate dimming when at least a first motion sensor senses no motion for at least a designated period of time, said dimming to continue to not less than a designated percentage unless motion is detected by at least one motion sensor during said dimming.

Passage 62. A fixture as recited in Passage 61, wherein the designated percentage is ten percent.

Passage 63. A fixture as recited in Passage 61, wherein the designated percentage is forty percent.

Passage 64. A fixture as recited in Passage 61, wherein the designated percentage is seventy percent.

Passage 65. A fixture as recited in Passage 61, wherein the fixture is also configured to permit the designated percentage to be altered.

Passage 66. A fixture as recited in Passage 61, wherein the designated period of time is five seconds.

Passage 67. A fixture as recited in Passage 61, wherein the designated period of time is three minutes.

Passage 68. A fixture as recited in Passage 61, wherein the designated period of time is ten minutes.

Passage 69. A fixture as recited in Passage 61, wherein the fixture is also configured to permit the designated period of time to be altered.

Passage 70. A fixture as recited in Passage 61, wherein the first motion sensor is on the fixture.

Passage 71. A fixture as recited in Passage 61, wherein the fixture is further configured to brighten, when the fixture is at a dimmed brightness and at least one motion sensor detects motion.

Passage 72. A fixture as recited in Passage 71, wherein the fixture is configured to brighten back to one hundred percent brightness when the fixture is at a dimmed brightness and said at least one motion sensor detects motion.

Passage 73. A lighting control system, comprising:
at least a first fixture and a second fixture; and
at least a first actuator,
the first fixture comprising at least a first light sensor,
the second fixture comprising at least a second light sensor,
the first actuator configured to, when actuated, cause the first fixture to be assigned to at least one zone and the second fixture to be assigned to at least one zone.

Passage 74. A lighting control system as recited in Passage 73, wherein the first actuator is on the first fixture.

Passage 75. A lighting control system as recited in Passage 73, wherein:
each fixture in the system has at least one actuator, and
each actuator in the system is configured to, when actuated, cause each fixture in the system to be assigned to at least one zone.

Passage 76. A lighting control system as recited in Passage 75, wherein each actuator in the system is configured to, when actuated, cause each fixture in the system to flash.

Passage 77. A lighting control system as recited in Passage 76, wherein:
the lighting control system is configured to assign the first and second fixtures to different zones if (1) brightness detected by the first light sensor is less than a first brightness when the second fixture is illuminated, and/or (2) brightness detected by the second light sensor is less than said first brightness when the first fixture is illuminated.

Passage 78. A lighting control system as recited in Passage 73, wherein:
the first fixture further comprises at least a first light source, and
the second fixture further comprises at least a second light source.

Passage 79. A lighting control system as recited in Passage 78, wherein:
the first actuator is configured to, when actuated, cause the first fixture to be assigned to at least one zone and the second fixture to be assigned to at least one zone,
the second actuator is configured to, when actuated, cause the first fixture to be assigned to at least one zone and the second fixture to be assigned to at least one zone.

Passage 80. A lighting control system as recited in Passage 78, wherein the first actuator is configured to, when actuated:
cause the first fixture to flash, and
cause the second fixture to flash.

Passage 81. A lighting control system as recited in Passage 80, wherein:
the lighting control system is configured to assign the first and second fixtures to different zones if (1) brightness detected by the first light sensor is less than a first brightness when the second fixture is illuminated, and/or (2) brightness detected by the second light sensor is less than said first brightness when the first fixture is illuminated.

Passage 82. A lighting control system as recited in Passage 80, wherein:
the first actuator is on the first fixture, and
a second actuator is on the second fixture.

Passage 83. A lighting control system as recited in Passage 78, wherein:
the first actuator is on the first fixture,
a second actuator is on the second fixture,
the first actuator is configured to, when actuated:
cause the first fixture to flash, and
cause the second fixture to flash,
the second actuator is configured to, when actuated:
cause the first fixture to flash, and
cause the second fixture to flash.

Passage 84. A lighting control system as recited in Passage 78, wherein:
each fixture in the system has at least one actuator, and
each actuator in the system is configured to, when actuated, cause each fixture in the system to flash.

Passage 85. A lighting control system as recited in Passage 73, wherein:
the system further comprises at least a first processor, and
the first actuator is on the processor.

Passage 86. A lighting control system as recited in Passage 73, wherein:
the system further comprises at least a first wireless gateway, and
the first actuator is on the processor.

Passage 87. A lighting control system, comprising:
at least a first fixture and a second fixture; and
at least a first processor,
the first fixture comprising at least a first light sensor and at least a first wireless transmitter,
the second fixture comprising at least a first light source and at least a first wireless receiver,
the first wireless transmitter configured to transmit wireless signals to the first processor,
the first wireless receiver configured to receive wireless signals from the first processor.

Passage 88. A lighting control system, comprising:
at least a first fixture and a second fixture; and
the lighting control system configured to assign to at least the first fixture and the second fixture a first profile selected from among at least two profiles,
each of the at least two profiles comprising:
a limit on the highest rate at which fixtures can be dimmed as a result of no motion being detected, a limit on the lowest light level down to which fixtures can be dimmed as a result of no motion being detected, a limit on the highest rate at which fixtures can be dimmed as a result of a particular level of light being detected, a limit on the lowest light level down to which light sources can be dimmed as a result of a particular level of light being detected, and/or a limit on the maximum difference between the light level of the first fixture and the light level of the second fixture.

Passage 89. A lighting control system as recited in Passage 88, wherein the lighting control system is configured:

to have selections made to indicate that the profile is to be changed for a fixture, and to allow a fixture to be selected by shining at least one lighting device toward the fixture.

Passage 90. A lighting control system as recited in Passage 88, wherein the lighting control system is configured:

to have selections made to indicate that the profile is to be changed for a zone comprising at least one fixture, and to allow a first zone to be selected by shining at least one lighting device toward a fixture in the first zone.

Passage 91. A lighting control system as recited in Passage 88, wherein the lighting control system is configured to have at least one selection made to indicate that the profile is to be changed for the lighting control system.

Passage 92. A lighting control system as recited in Passage 88, wherein the first fixture and the second fixture are both in a first zone.

Passage 93. A lighting control system as recited in Passage 88, wherein the lighting control system is configured to assign a profile to the entire lighting control system, the lighting control system comprising the first fixture, the second fixture and at least a third fixture.

Passage 94. A lighting control system as recited in Passage 93, wherein:

the lighting control system comprises at least two zones, and at least one fixture is in each of the zones.

Passage 95. A lighting control system as recited in Passage 88, wherein:

the lighting control system is configured:

to assign each fixture to at least one zone, and to assign a profile to each zone.

Passage 96. A lighting control system as recited in Passage 88, wherein:

the lighting control system is configured to assign a profile to each fixture in the lighting control system.

Passage 97. A method, comprising:

actuating a first actuator on a first fixture in a lighting control system, thereby causing the first fixture and at least a second fixture in the lighting control system to each be assigned to at least one zone.

Passage 98. A method as recited in Passage 97, wherein:

the first fixture comprises at least a first light source and at least a first light sensor, the second fixture comprises at least a second light source and at least a second light sensor, and said actuating said first actuator:

causes the first fixture to be illuminated and then dimmed, and causes the second fixture to be illuminated and then dimmed.

Passage 99. A method as recited in Passage 97, wherein said actuating said first actuator causes every fixture in the system to be assigned to at least one zone.

Passage 100. A method as recited in Passage 97, wherein said actuating said first actuator causes every fixture in the system that comprises at least one light source to be illuminated and then dimmed.

Passage 101. A method as recited in Passage 97, wherein said actuating said first actuator causes every fixture in the system that comprises at least one light source to be illuminated to a first brightness and then dimmed to a second brightness, the second brightness not greater than about 25 percent of the first brightness.

Passage 102. A method, comprising:

shining at least one lighting device toward a first fixture in a first zone in a lighting control system, thereby selecting the first fixture to be moved from the first zone.

Passage 103. A method as recited in Passage 102, wherein the method further comprises shining at least one lighting device toward a second fixture in a second zone in the lighting control system, thereby causing the first fixture to be changed from the first zone to the second zone.

Passage 104. A method, comprising:

detecting a sequence of light brightness measurement values at a first light sensor of a first fixture over a time-span of at least twenty-four hours, each light brightness measurement value comprising a value corresponding to a light brightness at the first light sensor, and identifying at least a first period of time that is of a first duration and that has the smallest average light brightness of any period of said first duration during said time-span.

Passage 105. A method as recited in Passage 104, wherein the method further comprises dimming the fixture when the brightness at the first light sensor exceeds the smallest average light brightness after the time-span.

Passage 106. A method as recited in Passage 104, wherein the method further comprises dimming the fixture to maintain the brightness at the first light sensor at about the smallest average light brightness, during at least one time period that is after the time-span.

Passage 107. A method as recited in Passage 104, wherein the method further comprises detecting a sequence of light brightness measurement values over a time-span of at least twenty-four hours, each light brightness measurement value comprising a value corresponding to a light brightness at the first light sensor, said time-span occurring during the first forty-eight hours after the fixture is first supplied with power.

Passage 108. A method, comprising dimming a fixture at a first rate when at least a first motion sensor senses no motion for at least a designated period of time.

Passage 109. A method as recited in Passage 108, wherein the first motion sensor is on the fixture.

Passage 110. A method as recited in Passage 108, wherein said dimming comprises dimming the fixture at said first rate when at least said first motion sensor senses no motion for at least a designated period of time, to not less than a designated percentage.

Passage 111. A method as recited in Passage 108, wherein the method further comprises brightening the fixture at a second rate when the fixture is at a dimmed brightness and at least one motion sensor detects motion.

Passage 112. A method, comprising dimming a fixture to not less than a designated percentage when at least a first motion sensor senses no motion for at least a designated period of time.

Passage 113. A method as recited in Passage 112, wherein the first motion sensor is on the fixture.

Passage 114. A method as recited in Passage 112, wherein the fixture is further configured to brighten, when the fixture is at a dimmed brightness and at least one motion sensor detects motion.

Passage 115. A method comprising:
assigning to at least a first fixture and a second fixture a first profile selected from among at least two profiles,
the first fixture and the second fixture both in a lighting control system,
each of the at least two profiles comprising:
a limit on the highest rate at which fixtures can be dimmed as a result of no motion being detected,
a limit on the lowest light level down to which fixtures can be dimmed as a result of no motion being detected,
a limit on the highest rate at which fixtures can be dimmed as a result of a particular level of light being detected,
a limit on the lowest light level down to which light sources can be dimmed as a result of a particular level of light being detected, and/or
a limit on the maximum difference between the light level of the first fixture and the light level of the second fixture.

Passage 116. A method as recited in Passage 115, wherein the method further comprises:
making selections to indicate that the profile is to be changed for a fixture, and
selecting a fixture by shining at least one lighting device toward the fixture.

Passage 117. A method as recited in Passage 115, wherein the method further comprises:
making selections to indicate that the profile is to be changed for a zone comprising at least one fixture, and
selecting a first zone by shining at least one lighting device toward a fixture in the first zone.

Passage 118. A method as recited in Passage 115, wherein the method further comprises making at least one selection to indicate that the profile is to be changed for the lighting control system.

Passage 119. A method as recited in Passage 115, wherein the first fixture and the second fixture are both in a first zone.

Passage 120. A method as recited in Passage 115, wherein the method further comprises assigning a profile to the entire lighting control system, the lighting control system comprising the first fixture, the second fixture and at least a third fixture.

Passage 121. A method as recited in Passage 120, wherein:
the lighting control system comprises at least two zones, and
at least one fixture is in each of the zones.

Passage 122. A method as recited in Passage 115, wherein the method comprises assigning each fixture to at least one zone, and assigning a profile to each zone.

Passage 123. A method as recited in Passage 115, wherein the method comprises assigning a profile to each fixture in the lighting control system.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting control systems and/or the fixtures described herein can be integrated. Any structural part of the lighting control systems and/or the fixtures described herein can be provided in two or more parts (which may be held together in any known way, e.g., with adhesive, screws, bolts, rivets, staples, etc.). Similarly, any two or more actions in the methods described herein can be conducted simultaneously, and/or any action can be conducted in a series of steps.

Figure 4:
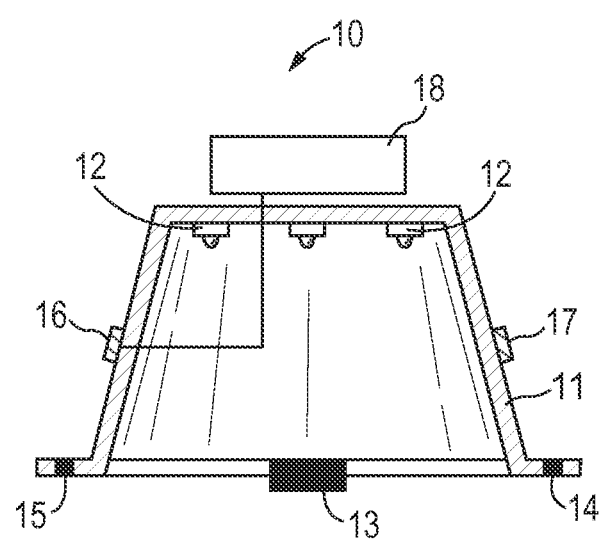
FIG. 4 illustrates a lighting fixture in accordance with an embodiment of the present invention.

FIG. 4 illustrates the lighting fixture 10 in accordance with an embodiment of the present invention. Here, the lighting fixture 10 comprises the actuator 13, the light sensor 14, and the motion sensor 15. In addition, the lighting fixture 10 includes the wireless transmitter 16, the wireless receiver 17, and a processor 18. In some embodiments, the processor 18 causes the lighting fixture 10 to be assigned to a zone when the actuator 13 is activated.

FIG. 5 is a schematic overhead view of a pair of rooms (comprising the first room 45 and the second room 46) in which there is provided a lighting control system according to the present inventive subject matter, the lighting control system comprising the first fixture 31, the second fixture 32, the third fixture 33, the fourth fixture 34, the fifth fixture 35, the processor 36, the wireless gateway 37, and the ethernet cable 38. There are also depicted in FIG. 5 the portable computer 39, the smart phone 40, the wireless switch 41 and the lighting device 42 (in the form of a flashlight). In the lighting control system depicted in FIG. 5, the first fixture 31, the second fixture 32, and the third fixture 33 are in a first zone 43, while the fourth fixture 34 and the fifth fixture 35 are in a second zone 44. Moreover, the first fixture 31 includes the actuator 13, which is depicted in FIG. 2 and the fixture 10.

The invention claimed is:
1. A lighting fixture comprising:
a light source;
an ambient light sensor; and
a control system configured to:
drive the light source;
instruct another lighting fixture to flash lights associated with the another lighting fixture;
monitor light flashing of the another lighting fixture via the ambient light sensor; and
based on the light flashing, associate the lighting fixture with the another lighting fixture to form a group of lighting fixtures.
2. The lighting fixture as recited in claim 1, wherein the control system is further configured to cause the lighting fixture to be illuminated and then dimmed.
3. The lighting fixture as recited in claim 1, wherein the lighting fixture further comprises at least a motion sensor.
4. The lighting fixture as recited in claim 1, wherein the lighting fixture further comprises at least one wireless transmitter.
5. The lighting fixture as recited in claim 1, wherein the lighting fixture further comprises at least one wireless receiver.
6. The lighting fixture as recited in claim 1, wherein the lighting fixture further comprises at least one microprocessor.
7. The lighting fixture as recited in claim 1, wherein the lighting fixture is pre-programmed.

8. The lighting fixture as recited in claim 7, wherein:
the lighting fixture further comprises at least a motion sensor, and
the lighting fixture is pre-programmed to dim if no motion is detected by the motion sensor for at least a first length of time.

9. The lighting fixture as recited in claim 7, wherein the lighting fixture is pre-programmed to dim if the ambient light sensor detects a brightness in excess of a first light brightness.

10. The lighting fixture as recited in claim 1, wherein:
the lighting fixture begins to dim when the ambient light sensor detects light of a brightness that is in excess of a particular set brightness level.

11. The lighting fixture as recited in claim 1, wherein:
the lighting fixture varies in brightness of light emission when the ambient light sensor detects light of a brightness that exceeds a particular set brightness level and continues to vary the brightness of light emission until the ambient light sensor detects that the brightness of light emission no longer exceeds the particular set brightness level.

12. The lighting fixture as recited in claim 1, wherein:
the lighting fixture begins to dim when the ambient light sensor detects light of one or more particular set color hues.

13. The lighting fixture of claim 1, wherein the control system is further configured to:
monitor ambient light; and
control an output of the lighting fixture based on the ambient light.

14. The lighting fixture of claim 1, wherein the control system comprises a processor.

* * * * *